United States Patent
Nishino et al.

(10) Patent No.: US 8,247,026 B2
(45) Date of Patent: Aug. 21, 2012

(54) OPTICAL FILM AND METHOD FOR PRODUCING SAME

(75) Inventors: Fumiaki Nishino, Ichihara (JP);
Katsunori Nishiura, Ichihara (JP);
Kazuyuki Fukuda, Ichihara (JP);
Toshihiko Takaki, Chiba (JP); Takehiro Miyashita, Ichiraha (JP)

(73) Assignee: Mitsui Chemicals, Inc., Tokyo (JP)

( * ) Notice: Subject to any disclaimer, the term of this patent is extended or adjusted under 35 U.S.C. 154(b) by 930 days.

(21) Appl. No.: 12/293,990

(22) PCT Filed: Mar. 19, 2007

(86) PCT No.: PCT/JP2007/055487
§ 371 (c)(1),
(2), (4) Date: Sep. 22, 2008

(87) PCT Pub. No.: WO2007/108432
PCT Pub. Date: Sep. 27, 2007

(65) Prior Publication Data
US 2009/0123698 A1      May 14, 2009

(30) Foreign Application Priority Data

Mar. 20, 2006  (JP) .................................. 2006-076767
Dec. 12, 2006  (JP) .................................. 2006-334374

(51) Int. Cl.
*B05D 5/06*       (2006.01)
(52) U.S. Cl. ........................................................ 427/162
(58) Field of Classification Search .................. 427/162
See application file for complete search history.

(56) References Cited

U.S. PATENT DOCUMENTS 5,976,680 A * 11/1999 Ikemori et al. ................ 428/212
2005/0128379 A1 * 6/2005 Matsunaga et al. ............. 349/64

FOREIGN PATENT DOCUMENTS

| JP | 03-26481 Y2 | 6/1991 |
| JP | 08-073739 A | 3/1996 |

(Continued)

OTHER PUBLICATIONS

Machine translation of Haraguchi et al, JP 09-087526, Mar. 31, 1997.*

(Continued)

*Primary Examiner* — Timothy Meeks
*Assistant Examiner* — Elizabeth Burkhart
(74) *Attorney, Agent, or Firm* — Foley & Lardner LLP

(57) ABSTRACT

Disclosed is a method for producing an optical film composed of a transparent resin and a metal oxide, which film has high light transmittance and light diffusion property even it is formed thin. Also disclosed is such an optical film. Specifically disclosed is a method for producing an optical film having a total light transmittance of not less than 70% and a haze value of not less than 20%, which comprises a step (A) wherein a metal compound to form a metal oxide through a sol-gel reaction is subjected to a sol-gel reaction in a solvent; a step (B) for providing a solution containing a transparent resin as a solute; a step (C) for mixing the mixture obtained in the step (A) with the solution obtained in the step (B); and a step (D) wherein the mixture obtained in the step (C) is applied or spread over a substrate or container and then heated for evaporating the solvent, thereby forming a film thereon.

13 Claims, 1 Drawing Sheet

4 μm

FOREIGN PATENT DOCUMENTS

| | | | | |
|---|---|---|---|---|
| JP | 08076112 | A | * | 3/1996 |
| JP | 09-087526 | A | | 3/1997 |
| JP | 2000-122038 | A | | 4/2000 |
| JP | 2003-109747 | A | | 4/2003 |
| JP | 2003-145560 | A | | 5/2003 |
| JP | 2004-198743 | A | | 7/2004 |
| JP | 2004-224941 | A | | 8/2004 |
| JP | 2005-055861 | A | | 3/2005 |
| JP | 2006-330175 | A | | 12/2006 |

OTHER PUBLICATIONS

Sumiko Sakka, "Sol-Gelhou No Ouyou ("Applications of Sol-gel Method")", 1997, Agne Shofusha.

International Search Report dated Apr. 24, 2007 for International Application No. PCT/JP2007/055487.

"Development and Application Techniques of Optical Organic Polymer Material", Development and Application of Optical Polymer Material, p. 183-185, vol. 6.

Sumio Sakka, Application of Sol-gel Method, p. 57-59 (1997), Agne Shofusha.

Sumio Sakka, Science of Sol-gel Method, p. 17-27, Agne Shofusha.

Hiroshi Hirashima, "A Method for Producing a Thin Film by Newly Sol-Gel Reaction", Technology of Manufacturing Functional Thin Films by Advanced Sol-gel method, p. 29, Sogo Gijutu Center.

Sumio Sakka, "Science of Sol-Gel Reaction", Science of Sol-gel Method, p. 154-163, Agne Shofusha.

* cited by examiner

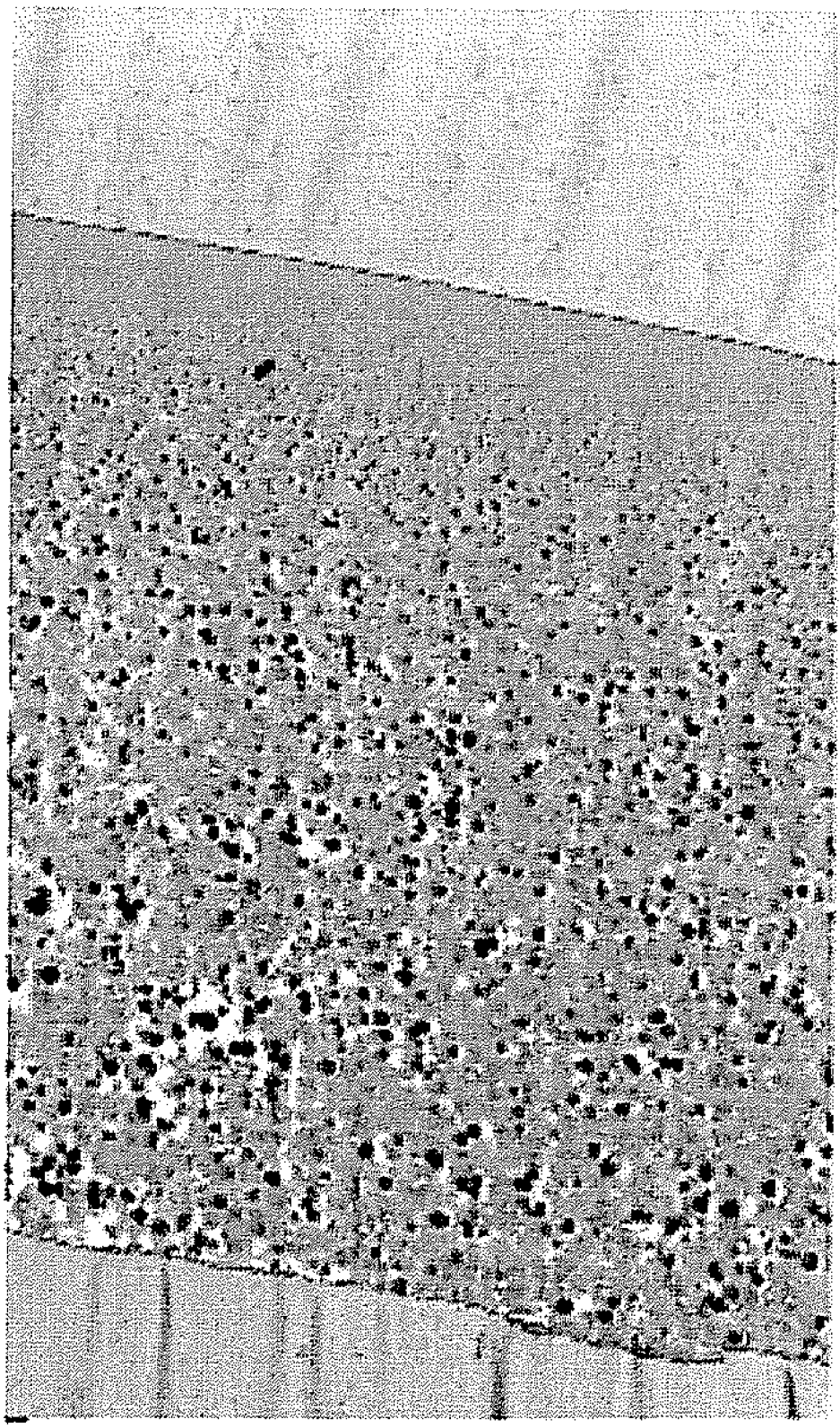

OPTICAL FILM AND METHOD FOR PRODUCING SAME

TECHNICAL FIELD

The present invention relates to an optical film and a method for producing the same.

BACKGROUND ART

In liquid crystal displays, a light emitted from a cold cathode-ray tube (typically a fluorescent tube) is introduced through a light guiding plate to a display screen. In that case, an optical diffusion film for uniformizing the brightness of the whole screen is used in order to prevent brightness unevenness from occurring. The optical diffusion film is required to have a function of making an image of a light source invisible by diffusing light emitted from the light source and a function of maintaining the brightness of the whole screen without impairing the brightness of the light source. Therefore, the optical diffusion film is required to have properties in which loss by a reflection and absorption is minimized, a scattered light is passed and a parallel light is not passed.

Conventionally, as the optical diffusion film, there has been used a product obtained by matting the surface of a transparent sheet or film such as glass, an acrylic resin, polycarbonate, polyester and the like. In addition, there has been also used a transparent sheet or film to which inorganic particulates such as calcium carbonate, silica particles and the like and transparent resin particles such as polystyrene, PMMA and the like are added. Furthermore, there has been also used a product in which a resin to which the particles are added onto the surface of a transparent sheet and the like is provided as a coating film (for example, Patent Documents 1 to 3).

Incidentally, recently, in liquid crystal displays, a high brightness and thin-profile display is more strongly demanded than before. For this reason, an optical diffusion film in the optical guide system is required to satisfy both a suitable light transmittance and an adequate range of a haze value and have a thin film thickness.

As the optical diffusion film, there is known an optical diffusion material in which a metallic oxide of which particle diameter is longer than the visible light wavelength range is dispersed in a polymer (an organic polymer). For example, in Patent Document 4, there is disclosed an optical diffusion material in which metallic oxide particles having a refractive index different from that of a polymer are dispersed in a polymer. The material may be obtained by a convenient method of mixing the particles with a polymer. However, an optical diffusion material to which metallic oxide particles with almost single size (the particle size distribution is a single dispersion) are added has a problem of exhibiting wavelength dependency that the scattering efficiency of a specific wavelength becomes high and the transmitted light is colored (refer to "Development and Application Techniques of Optical Organic Polymer Materials" p. 183). In addition, there is also a problem that the coagulation of particles is difficult to suppress only by mixing metallic oxide particles with a polymer.

On the other hand, as a method of obtaining a composite by dispersing inorganic compound particles in a polymer while suppressing coagulation, there is known a method of obtaining a polymer-metallic oxide composite with the use of a sol-gel method (refer to Patent Document 5 and Non-Patent Document 1). The sol-gel method is a method in which a metallic oxide may be produced by subjecting a metallic alkoxide, a metallic acetylacetonate, a metallic carboxylate and the like to hydrolysis and polycondensation reaction (sol-gel reaction). The sol-gel method is known as a suitable method for propagating a composite comprising of an inorganic material and an organic material which is decomposed at a higher temperature because a metallic oxide may be synthesized at a relatively lower temperature in a solution. Since a metallic oxide may be synthesized from a reaction at molecular level by the sol-gel method, a metallic oxide with a particle size of a nano level may be dispersed in a polymer. With the use of such characteristics, the sol-gel method is applied especially as a method of producing a nanocomposite of a metallic oxide with a transparent resin material. Such a nanocomposite material is generally known to have increased thermal and mechanical properties without losing transparency, and there are many examples of reports for various resins.

As the examples of using the sol-gel reaction, there are organic and inorganic composite optical films excellent in transparency which are obtained by subjecting a metallic alkoxide compound and the like to sol-gel reaction in a state where a polymer is dissolved in a solvent such as an amide compounds, an urea compounds or the like (Patent Document 6).

In addition, in Patent Document 7, there is disclosed a method in which a metallic alkoxide is impregnated in a polymer so that a concentration gradient may occur, followed by subjecting the metallic alkoxide to polycondensation reaction (sol-gel reaction). The polymer-metallic oxide composite obtained by the method has a structure in which the particle size of the metallic oxide is gradient in the film thickness direction.

Patent Document 1: Japanese Utility Model Examined Application No. Hei 3-26481
Patent Document 2: Japanese Patent Laid-Open Publication No. 2004-198743
Patent Document 3: Japanese Patent Laid-Open Publication No. 2005-55861
Patent Document 4: Japanese Patent Laid-Open Publication No. 2003-109747
Patent Document 5: Japanese Patent Laid-Open Publication No. Hei 8-73739
Patent Document 6: Japanese Patent Laid-Open Publication No. 2005-264038
Patent Document 7: Japanese Patent Laid-Open Publication No. Hei 9-87526
Non-Patent Document 1: "Sol-Gelhou No Ouyou" ("Application of Sol-Gel Reaction") authored by Sumio Sakka and published by Agne Shofusha in 1997.

DISCLOSURE OF THE INVENTION

Problems to be Solved by the Invention

The methods of processing the surface to a matted state disclosed in Patent Documents 1 to 3 are a method of transcribing a concavity and convexity on a film surface by using a sandblasted die or an embossing roll. However, these methods are difficult to be applied for preparing a thin film having a film thickness of 50 μm or less. The reason is that for the strength of the film itself, the thin film cannot withstand the processing, resulting in deformation such as warpage and the like. In addition, in liquid crystal displays, when an optical film of which surface is processed to a matted state is used so that the surface is brought into contact with a prism sheet, the prism may be damaged, thereby causing a problem that the light collecting properties are deteriorated and the like in some cases.

In addition, in the method such as adding particles having a different refractive index inside a transparent sheet or film, which is disclosed in Patent Document 4, there is a problem that the wavelength dependency occurs to a diffused light of the film obtained as mentioned above. In order to improve this problem, the particle size of the metallic oxide may be changed in the cross-section direction of the film. However, since the particle size gradient structure may not be produced only by mixing the particles of metallic oxide having a different particle size with a polymer and the particles coagulate, it is difficult to solve the problem of wavelength dependency.

Further, the smoothness when a thin film is produced is difficult to maintain only by mixing metallic oxide particles with a polymer. In order to make the film thickness thin, it is required to use the metallic oxide particles sufficiently small relative to the film thickness in order to prevent that the metallic oxide particles are extruded on the film surface and the surface smoothness is impaired. However, if the particle size of the metallic oxide is small, the scattering efficiency is reduced. Further, the smaller the particle size, the more likely the particles coagulate each other, thereby causing a problem to the optical diffusion properties of the film and its uniformity.

The sol-gel methods disclosed in Patent Document 5 and Non-Patent Document 1 are a method of capable of dispersing a metallic oxide in a polymer while suppressing coagulation, as mentioned above. However, this method is a method originally developed for dispersing the particles at a nano level in a polymer. Since a composite obtained by the method in which a metallic oxide is dispersed at a nano level in a polymer is transparent and the optical diffusion effect is not high, it is not suitable as an optical film for diffusing light.

In general, a metallic oxide is required to be dispersed in a particle size of approximately a submicron order in a polymer in order to provide a sufficient light diffusion effect. There has never been reported a method for obtaining a composite in which a metallic oxide of submicron or larger size is dispersed in a polymer by using the methods described in these documents. If the particle size of a metallic oxide is submicron size or more, the transparency of the composite disappears and further the improvement effect of thermal and mechanical properties is reduced. Furthermore, since a metallic oxide of submicron size may be easily produced by sintering and comminution, it is believed that the necessity of using a sol-gel method is reduced. The method described in Patent Document 6 intends to obtain a transparent composite by dispersing a metallic oxide at a nano level. That is, there has never existed an idea itself of producing an optical film excellent in light diffusing property by using a sol-gel method.

On the other hand, the method described in Patent Document 7 is a method of obtaining a composite of the structure in which the particle size of a metallic oxide is gradient in the film thickness direction in a polymer by a sol-gel reaction. The method intends to obtain a composite excellent in mechanical strength, and no description is made in use for optical applications. In addition, the method is complicated in the process. Further, the material obtained by this method has a problem such as that a film warps by the temperature change due to the difference in the coefficient of thermal expansion in the thickness direction. This is inferred that the volume fraction of the metallic oxide varies in the thickness direction because the metallic oxide is present with a concentration gradient in the film.

That is, there has been demanded an optical film which is a thin film and is excellent in surface smoothness as well as has a high light diffusing property while having a high total light transmittance, but until now there has never been proposed a method for obtaining such a film. In addition, there has been demanded an optical film which has a high light diffusing property, has no wavelength dependency and is excellent in shape stability to the temperature change, but there has never existed such a film.

Consequently, it is an object of the present invention to provide a method for producing an optical film which is a thin film and is excellent in surface smoothness, and has a high light diffusing property while having a high total light transmittance. In addition, it is another object of the present invention to provide an optical film which has a high light diffusing property, has no wavelength dependency and is excellent in shape stability to the temperature change. That is, the above-mentioned problems are solved by the following methods for producing an optical film of the present invention.

[1] A method for producing an optical film having a total light transmittance of 70% or more and a haze value of 20% or more, the method comprising the steps of:
(A) subjecting a metallic compound to form a metallic oxide through a sol-gel reaction to the sol-gel reaction in a solvent,
(B) providing a solution containing a transparent resin as a solute,
(C) mixing the mixture obtained in Step (A) and the solution obtained in Step (B), and
(D) applying or spreading the mixture obtained in Step (C) to a substrate or container, followed by heating to evaporate the solvent to form a film.

[2] The method for producing an optical film described in [1], wherein before Step (D), the method further comprises a step of allowing to proceed a sol-gel reaction for the metallic oxide present in the mixture obtained in Step (C).

[3] A method for producing an optical film having a total light transmittance of 70% or more and a haze value of 20% or more, the method comprising the steps of:
(E) providing a solution containing a transparent resin as a solute,
(F) performing a sol-gel reaction by mixing a metallic compound to form a metallic oxide through a sol-gel reaction in the solution obtained in Step (E) and
(G) applying or spreading the mixture obtained in Step (F) to a substrate or container, followed by heating to evaporate the solvent to form a film.

[4] The method for producing an optical film described in [3], wherein before Step (G), the method further comprises a step of allowing to proceed a sol-gel reaction by mixing the mixture obtained in Step (F) with a metallic compound to form a metallic oxide through a sol-gel reaction, a solvent, water or a catalyst.

[5] The method for producing an optical film described in any of [1] to [4], wherein the film-forming Step of (D) or (G) comprises a step of growing the particles of a metallic oxide formed through the sol-gel reaction.

[6] The method for producing an optical film described in [5], wherein the step of growing the particles of the metallic oxide is a step in which a particle size of the particles gradiently varies to the thickness direction of the optical film.

[7] The method for producing an optical film described in any of [1] to [6], wherein the transparent resin is polyimide, polycarbonate, polyacrylate, polymethacrylate, polyetherketone, polyetheretherketone, polystyrene, polyester, epoxy resin, polyamide, polysulfone, polyaramid, polyurethane, polyvinyl acetate, polyvinylalcohol or polyacrylic acid.

[8] The method for producing an optical film described in any of [1] to [7], wherein the metallic compound to form a metallic oxide through the sol-gel reaction contains silicon, titanium, zirconium or aluminum element.

[9] The method for producing an optical film described in any of [1] to [8], wherein the metallic compound to form a metallic oxide through the sol-gel reaction is a metal alkoxide, a metal acetylacetonate or a metal carboxylate, or a polycondensation product thereof.

[10] The method for producing an optical film described in any of [1] to [9], wherein in the sol-gel reaction, an inorganic acid, an organic acid, an inorganic base or an organic base is used as a catalyst.

[11] The method for producing an optical film described in any of [1] to [10], wherein Step (D) or Step (G) includes a step of heating at 40 to 180° C. for 1 to 50 hours to evaporate the solvent.

[12] The method for producing an optical film described in [1], [2] or any of [4] to [11], wherein the solvent used in Step (A) or the solvent mixed with the mixture obtained in Step (F) is water, N,N-dimethylacetamide, N,N-dimethylformamide, N-methyl-2-pyrroridone, DMSO, cyclopentanone, cyclohexanone, methyl ethyl ketone, acetone, THF, dioxane, methanol, ethanol, propanol, butanol, cyclohexanol, methycellosolve or ethylcellosolve.

[13] The method for producing an optical film described in any of [1] to [12], wherein the metallic compound to form a metallic oxide through the sol-gel reaction includes an alkyl metal alkoxide having an alkyl group and an alkoxyl group in the molecule, and the solvent of the solution containing the transparent resin as a solute contains water.

[14] The method for producing an optical film described in any of [1] to [13], wherein the optical film is an optical diffusion film.

[15] An optical film produced by the method described in any of [1] to [13], having a thickness of 30 μm or less and a haze value of 70% or more.

[16] The optical film described in [15], having one surface or both surfaces of the film with a mean roughness of a surface (Ra) of 100 nm or less.

In addition, the above problems may be solved by the following optical films of the present invention.

[17] An optical film in which a metallic oxide is dispersed in a transparent resin, wherein with respect to the thickness direction of the optical film, the particle size of the metallic oxide particles gradiently varies and the volume fraction of the metallic oxide substantially does not vary.

[18] The optical film described in [17], wherein when X is the mean particle size per unit area of the metallic oxide in the range from one surface of the optical film to 40% of the thickness, Y is the mean particle size per unit area of the metallic oxide in the range from another surface of the optical film to 40% of the thickness, and X is larger than Y, a particle size gradient defined as X/Y is 1.2 or more.

[19] The optical film described in [17] or [18], wherein when W is the volume fraction of the metallic oxide in the range from one surface of the optical film to 40% of the thickness, V is the volume fraction of the metallic oxide in the range from another surface of the optical film to 40% of the thickness, and W is the same as or more than V, a volume fraction gradient defined as W/V is 2 or less.

[20] An optical film described in any of [17] to [19], wherein the optical film is an optical diffusion film.

Effect of the Invention

The present invention may provide an optical film which is excellent in light diffusing property in that it has a total light transmittance of 70% or more and a haze value of 20%, is a thin film and is excellent in surface smoothness. In addition, the present invention may provide an optical film in which a metallic oxide is dispersed in a transparent resin, the particle size of the metallic oxide is gradiently varies in the film thickness direction of the optical film, and the volume fraction substantially does not vary. That is, the present invention may provide an optical film which has a high light diffusing property, has no wavelength dependency and is further excellent in shape stability to the temperature change.

BRIEF DESCRIPTION OF THE DRAWING

FIG. 1 is a TEM image of the cross-section of an optical film of the present invention in which a metallic oxide is dispersed in a transparent resin.

DETAILED DESCRIPTION OF THE PREFERRED EMBODIMENT

1. An Optical Film of the Present Invention

An optical film obtained by the present invention may be obtained by the method described later and is characterized in that it has a total light transmittance of 70% or more and a haze value of 20% or more. The film is also referred to as a "specific optical attribute film".
In addition, another optical film of the present invention is an optical film in which a metallic oxide is dispersed in a transparent resin and which is characterized in that the particle size of the metallic oxide is gradiently varies in the film thickness direction of the optical film and the volume fraction substantially does not vary. The film is referred to as a "gradient structure film".

The optical film refers to a film member used for optical applications such as a display material and the like. In addition, an optical film of the present invention may be an optical diffusion film. In a display plate and the like, the optical diffusion film is a member for uniformizing the brightness of the whole screen in order to prevent brightness unevenness from occurring when a light emitted from a light source is introduced through a light guiding plate to a display screen.

1-1 Concerning Specific Optical Attribute Film

The specific optical attribute film is characterized in that it is produced by the following method (hereinafter referred to as the "first method").

A production method comprising the steps of:
(A) subjecting a metallic compound to form a metallic oxide through a sol-gel reaction to the sol-gel reaction in a solvent,
(B) providing a solution containing a transparent resin as a solute,
(C) mixing the mixture obtained in Step (A) and the solution obtained in Step (B), and
(D) applying or spreading the mixture obtained in Step (C) to a substrate or container, followed by heating to evaporate the solvent to form a film.

In addition, the specific optical attribute film is characterized by being produced by the following method (hereinafter referred to as the "second method").

A production method comprising the steps of:
(E) providing a solution containing a transparent resin as a solute,
(F) performing a sol-gel reaction by mixing a metallic compound to form a metallic oxide through a sol-gel reaction in the solution obtained in Step (E) and (G) applying or spreading the mixture obtained in Step (F) to a substrate or container, followed by heating to evaporate the solvent to form a film.

(1) Optical Properties

The total light transmittance is represented by the following equation from the incident light irradiated to a sample, the diffuse transmitted light of the incident light which is diffused in a sample to transmit and the parallel transmitted light which propagates straight and transmits in the incident direction.

"Total Light transmittance" (%)=("Diffuse Transmitted Light"+"Parallel Transmitted Light")/"Incident Light"×100

As is clear from the above equation, the total light transmittance is high means that light including the diffused light is easily transmitted.

The haze value is a value represented by the following equation and is an index of a light diffusing capability.

"Haze Value" (%)=("Diffuse Light Transmittance"/ "Total Light Transmittance"×100

Provided that Diffuse Light Transmittance (%)="Diffuse Transmitted Light"/"Incident Light"×10

As is clear from the above equation, the haze value is high means that the ratio of the diffuse transmitted light is high among the transmitted light.

A specific optical attribute film of the present invention has a total light transmittance of 70% or more and a haze value of 20% or more. The film has a haze value preferably of 20% or more and less than 100% and more preferably of 50% or more and 95% or less. This reason is because the film is excellent in light-diffusing property.

In other words, a specific optical attribute film of the present invention has a high total light transmittance and among the transmitted light, the ratio of the diffuse transmitted light instead of the parallel transmitted light is high. That is, the specific optical attribute film is characterized in that it has a high light diffusing property (being excellent in light diffusing property).

(2) Transparent Resin

The specific optical attribute film of the present invention contains a transparent resin and metallic oxide particles dispersed in the transparent resin. The transparent resin is an organic polymer having a parallel light transmittance of 60% or more at a wavelength of 650 nm when the film thickness is 15 μm, and preferably an organic polymer having a parallel light transmittance of 70% or more at a wavelength of 650 nm.

The transparent resin used in the present invention preferably has a solubility in water or a solvent miscible with water. A method for producing the film, as mentioned later, includes a step of subjecting a metallic compound which forms a metallic oxide by a sol-gel reaction to a sol-gel reaction in a solution containing a transparent resin as a solute. Since water may be used in the sol-gel reaction, the metallic compound is readily subjected to the gel-sol reaction if the solute of the solvent is water or is miscible with water. The examples of such a transparent resin include polyimide, polycarbonate, polyacrylate, polymethacrylate (PMMA), polyetherketone, polyetheretherketone, polystyrene, polyester, epoxy resin, polyamide, polysulfone, polyaramid, polyurethane, polyvinyl acetate, polyvinylalcohol (PVA) and polyacrylic acid.

(3) Metallic Compound

A metallic compound used in the specific optical attribute film is not particularly limited as long as it is produced by using a sol-gel method. These examples include an oxide of lithium, sodium, copper, calcium, strontium, barium, zinc, boron, aluminum, gallium, yttrium, silicon, germanium, lead, phosphorus, antimony, vanadium, tantalum, tungsten, lanthanum, neodymium, titanium, or zirconium. If there is used an oxide of silicon, zirconium, titanium or aluminum among these, it is preferable because the light diffusing property is improved.

The content of the metallic oxide in the specific optical attribute film is preferably from 0.1 to 70 parts by mass and more preferably from 0.1 to 50 parts by mass, based on 100 parts by mass of a composite of the transparent resin and the metallic oxide, because of the excellent light scattering effect and mechanical strength of the film. The content of the metallic oxide here refers to ash remained after sintering an optical film composed of a composite of the transparent resin and metallic oxide at 800° C. in air.

The metallic oxide and transparent resin used in the specific optical attribute film is preferably selected from the viewpoint of the refractive index difference in order to satisfy specific optical properties. The refractive index difference (the difference between the refractive index of the metallic oxide and the refractive index of the transparent resin) is preferably 0.02 to 1.40 and more preferably 0.04 to 1.30. These preferable examples include a combination of a transparent resin such as methyl polymethacrylate, polyvinylalcohol or polyimide or the like and a metallic oxide such as silicon oxide or titanium oxide or the like.

(4) Particle Size and Particle Size Gradient of Metallic Oxide

The particle size of a metallic oxide in the specific optical attribute film is preferably from 0.001 μm to 100 μm and more preferably from 0.01 μm to 20 μm. Especially when the specific optical attribute film is used as an optical diffusion film, the particle size is preferably from 0.03 μm to 15 μm, because it satisfies the above-mentioned optical properties and is excellent in film surface smoothness. In addition, when metallic oxide particles exceeding 15 μm are present in a film, if the particles are present inside the film instead of on the film surface, it is preferable because the smoothness of the film is not impaired.

However, if the particle size of a metallic oxide is enlarged while the metallic oxide content is remained constant, the number of particles is reduced. Such an optical film may be reduced in light diffusing property. That is, since the particle size of a metallic oxide in the specific optical attribute film is influenced by the content of the metallic oxide, the particle size is preferably adjusted by also considering the content of the metallic oxide.

The shape and size of a metallic oxide in the specific optical attribute film are measured by a transmission electron microscope (TEM), a scanning electron microscope (SEM), an atomic force microscope (AFM) or X-ray scattering. A metallic oxide in the present invention is present by phase separating from the transparent resin and the shape is various. Since the metallic oxide is produced by a sol-gel reaction in a polymer as described later, it is amorphous in many cases.

In addition, a metallic oxide in the specific optical attribute film is preferably present so that the particle size of the metallic oxide particles gradiently varies with respect to the thickness direction of a film. The gradient variation with respect to the thickness direction of the particle size of a metallic oxide present in a film is referred to as a "particle size gradient". The particle size gradient is specifically defined as follows according to the mean particle size of a metallic oxide particles present per unit area in the range from both sides of the film to 40% of the film thickness. The mean particle size X of the particles present from one surface of the film to 40% of the film thickness (used as X area) is measured and the mean particle size Y of the particles present from another surface to the same range (used as Y area) is measured. X/Y is defined as a particle size gradient (provided that X is larger than Y). In the film, preferable is a particle size gradient in which the mean particle size of either the X area or Y area is larger and that of another is smaller. The particle size gradient in the film is preferably 1.2 to 100000, more preferably 1.5 to 50000 and further more preferably 1.6 to 10000.

The mean particle size is calculated in the range of the unit area preferably from 1 to 10000 μm², more preferably from 5 to 5000 μm² and especially preferably from 10 to 2500 μm², in the range from both sides of a film to 40% of the film thickness. The mean particle size may be determined, for example, by using an image analysis software (Image-Pro Plus, manufactured by Planetron Co., Ltd.) from an image obtained by TEM observation.

(5) Volume Fraction of Metallic Oxide

A specific optical attribute film preferably does not substantially vary in volume fraction of a metallic oxide in a film in the film thickness direction. The reason is that a film of such a structure has no difference in coefficient of thermal expansion in the thickness direction and no warpage due to temperature change and the like occurs. The volume fraction is determined as follows. Firstly, the cross-section of an optical cross-section is observed by TEM and then the resulting image is image-analyzed to determine the total area of the metallic oxide particles present in unit area. Next, the area is divided by unit area to determine an area fraction, which is defined as a volume fraction. For the image analysis, there is preferably used the above-mentioned image analysis software (Image-Pro Plus, manufactured by Planetron Co., Ltd.). The unit area is preferably from 1 to 1000 μm², more preferably from 5 to 500 μm² and further more preferably from 10 to 250 μm².

That a volume fraction in the film thickness direction does not substantially vary means that a volume fraction gradient defined as follows becomes approximately 1. When W is used as the volume fraction of the metallic oxide in the range (X area) from one surface of the optical film to 40% of the thickness and V is used as the volume fraction of the metallic oxide in the range (Y area) from another surface of the optical film to 40% of the thickness, the volume fraction gradient is represented by W/V (provided that W is V or more). The volume fraction gradient of an optical film of the present invention is preferably 2 or less and more preferably from 1.0 to 1.5. This reason is because the warpage of a film due to temperature change and the like may be reduced.

(6) Surface Smoothness of Film

The specific optical attribute film preferably has a mean surface roughness Ra of 100 nm or less. The reason is because if the surface smoothness of a film is reduced, other films are damaged when laminating with other films. For example, when the specific optical attribute film is used as an optical diffusion film used in LCD, a prism sheet is damaged in some cases if the surface smoothness is low. Therefore, if Ra is within the above range, the specific optical attribute film may be used without damaging other members when it is used in combination with other members.

(7) Thickness of Film

The specific optical attribute film of the present invention has a thickness of preferably from 5 to 500 μm, more preferably from 8 to 300 μm, further more preferably from 10 to 100 μm and especially preferably from 10 to 30 μm. This is because a thin profile device may be achieved when the film is used for a display device and the like.

In optical properties, surface smoothness and thickness, the specific optical attribute film of the present invention has preferably a thickness of 30 μm or less and a haze value of 70% or more, and more preferably a thickness of 30 μm or less, a haze value of 70% or more and an Ra of 100 nm or less.

1-2 Gradient Structure Film

A gradient structure film, which is another optical film of the present invention, is an optical film in which a metallic oxide is dispersed in a transparent resin, wherein the particle size of the metallic oxide gradiently varies in the thickness direction of the optical film and the volume fraction of the metallic oxide substantially does not vary. The optical film may be an optical diffusion film.

(1) Each Component

A similar one with the specific optical attribute film may be used for a transparent resin and a metallic oxide, which are used for a gradient structure film. The content of a metallic oxide is not particularly limited, but preferably is the same as described in Specific Optical Attribute Film.

(2) Particle Size Gradient and Volume Fraction of Metallic Oxide

The gradient structure film is characterized in that the particle size of the metallic oxide gradiently varies in the thickness direction. The gradient variation of the particle size is the same meaning as "particle size gradient" described in Specific Optical Attribute Film. The value of the particle size gradient preferably is also the same as described in Specific Optical Attribute Film. In addition, the volume fraction preferably is the same as described in Specific Optical Attribute Film.

(3) Optical Properties

The optical properties of the gradient structure film are not limited as long as they satisfy the properties as an optical film. Among them, the gradient structure film has a haze value preferably of 20% or more and less than 100% and especially preferably of 70% or more. The reason is because the gradient structure film is excellent in light diffusing capability.

(4) Surface Smoothness and Film Thickness

The surface smoothness and film thickness of the gradient structure film preferably are the same as described in Specific Optical Attribute Film.

Especially, in optical properties, surface smoothness and thickness, the gradient structure film preferably has a haze value of 70% or more, an Ra of 100 nm or less and a thickness of 30 μm or less.

2. Concerning a Method for Producing an Optical Film

The above-mentioned specific optical attribute film is produced by the first method including (A) to (D) or the second method including (E) to (G) as mentioned above. In addition, the gradient structure film may be arbitrarily produced but is preferably produced by the above-mentioned methods. Hereinafter, the first and second production methods are explained as a production method of a specific optical attribute film and a gradient structure film (which together may be called an "optical film of the present invention").

The production methods are divided into a "step of providing a mixture for a film" including (A) to (C) or (E) to (F) and a "film forming step" including (D) or (G). Accordingly, an explanation is made for each step.

1-1 Process of Providing a Mixture for a Film

In the present invention, a sol-gel reaction means a reaction (hereinafter referred to as "hydrolysis reaction") in which a functional group such as an alkoxide group and the like of a metallic compound is hydrolyzed with an acid or alkali catalyst to produce a hydroxyl group, and a reaction (hereinafter referred to as "polycondensation reaction") in which a hydroxyl group of the resulting metallic hydroxide is subjected to dehydration polycondensation.

(1) Step A of the First Method

A metallic compound which produces a metallic oxide through a sol-gel reaction used in the step refers to a compound which may be changed to a metallic oxide through the sol-gel reaction. A metallic compound has a structure in which a functional group is bonded to a metal atom. Hereinafter, the metallic compound may be simply referred to as a "metallic compound".

A metallic oxide in the finally resulting optical film is determined by the metal atom of a metallic compound. The preferred metallic oxide in an optical film of the present invention is as mentioned above. Therefore, the metallic compound preferably contains lithium, sodium, copper, calcium, strontium, barium, zinc, boron, aluminum, gallium, yttrium, silicon, germanium, lead, phosphorus, antimony, vanadium, tantalum, tungsten, lanthanum, neodymium, titanium, or zirconium, as a metal atom. For example, when an optical diffusion film is produced, as already mentioned, the metallic compound preferably contains silicon, zirconium, titanium and aluminum as a metal atom.

As the example of a metallic compound in which a functional group is bonded to the above-mentioned metals, there may be mentioned a metal-organic compound such as a metal alkoxide, a metal acetylacetonate, a metal carboxylate and the like, and a metal-inorganic compound such as a metal nitrate, a metal oxychloride, a metal chloride and the like (refer to "Sol-Gelhou No Kagaku" authored by Sumio Sakka and published by Agne Shofusha, p. 17). In the present invention, these compounds may be used alone or in combination of two or more kinds. In addition, there may be used a polycondensate (which is also referred to as a "partially hydrolyzed polycondensation compound") obtained by polycondensating a functional group of a part of these compounds.

The specific examples of the metal alkoxide include tetramethoxysilane (TMOS), tetraethoxysilane (TEOS), tetrapropoxysilane, tetraisopropoxysilane, methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, isopropyltriethoxysilane, dimethyldimethoxysilane, dimethyldiethoxysilane, diphenyldimethoxysilane, diphenyldiethoxysilane, trifluoromethyltrimethoxysilane, vinyltrimethoxysilane, vinyltriethoxysilane, phenyltrimethoxysilane, phenyltriethoxysilane, 2-(3,4-epoxycyclohexyl)ethyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, p-styryltrimethoxysilane, 3-methacryloxypropylmethyldimethoxysilane, 3-methacryloxypropylmethyldiethoxysilane, 3-methacryloxypropyltrimethoxysilane, 3-methacryloxypropyltriethoxysilane, 3-acryloxypropyltrimethoxysilane, 3-acryloxypropyltriethoxysilane, 3-chloropropyltriethoxysilane, 3-mercaptopropylmethyldimethoxysilane, 3-mercaptopropyltrimethoxysilane, 3-isocyanatepropyltriethoxysilane, tetramethoxytitanium, tetraethoxytitanium, titaniumisopropoxide, aluminum butoxide, zirconium tetra-n-butoxide, zirconium tetraisopropoxide, barium isopropoxide, calcium ethoxide and the like.

The specific examples of the metal acetylacetonate include zirconium acetylacetonate, titanium acetylacetonate, aluminum acetylacetonate, indium acetylacetonate, zinc acetylacetonate and the like. Among them, preferred are zirconium acetylacetonate, titanium acetylacetonate and aluminum acetylacetonate.

The specific examples of the metal carboxylate include lead acetate, yttrium stearate and barium oxalate.

Among the above compounds, preferred is an alkoxysilane such as TMOS, TEOS, titanium isopropoxide, aluminum butoxide, zirconium tetra-n-butoxide, zirconium tetraisopropoxide and the like. The reason is because the reaction is easily controlled by these compounds.

In addition, the refractive index of a metallic oxide in the finally resulting optical film may be adjusted by simultaneously using a metal compound having a different metal atom. The examples of such combination include an alkoxysilane in combination with tetramethoxytitanium, tetraethoxytitanium, titanium isopropoxide, aluminum butoxide, zirconium tetra-n-butoxide, zirconium tetraisopropoxide, zirconium acetylacetonate, titanium acetylacetonate or aluminum acetylacetonate or the like.

In Step (A), the metallic compound is subjected to a sol-gel solution in a solvent. If a metallic compound has a functional group such as an alkoxide group and the like in the sol-gel reaction, it is preferable that the metallic compound is hydrolyzed to change the alkoxide group to a hydroxyl group, followed by polycondensation reaction. For this purpose, water may be added where necessary. The water may contain a catalyst.

The above reaction may be carried out, for example, by dissolving the metallic compound in a solvent in advance and adding water which may contain a catalyst where necessary, at room temperature or by heating to a predetermined temperature. In this case, two or more kinds of the metallic compounds may be used, as mentioned above. Alternatively, the first metallic compound and the second metallic compound are separately subjected to a sol-gel reaction and then they may be mixed together. Further, the mixture may be subjected to a sol-gel reaction.

The solvent used in the reaction is not limited as long as it dissolves the metallic compound. However, preferred is a solvent which is compatible with or the same as the solvent used for the preparation of a solution containing a transparent resin used in Step (B) described later as a solute. The examples of the solvent include water, N,N-dimethylacetamide, N,N-dimethylformamide, N-methyl-2-pyrrolidone, DMSO, cyclopentanone, cyclohexanone, methyl ethyl ketone, acetone, THF, dioxane, methanol, ethanol, propanol, butanol, cyclohexanol, methylcellosolve, ethylcellosolve and the like.

The compounding ratio of the solvent used in Step (A) to the metallic compound is not particularly limited, but 0.1 to 100 g of the metallic compound is preferable relative to 10 g of the solvent.

The addition amount of water used in Step (A) is preferably 40 mole equivalent or less, more preferably 10 mole equivalent or less and further more preferably 5 mole equivalent or less, based on 1 mole of the metallic compound.

In addition, the catalyst used in the step is added for the purpose of allowing the hydrolysis or polycondensation reaction to proceed. A well known catalyst may be used as such a catalyst (refer to "Saishin Sol-Gelhou Niyoru Kinousei Hakumaku Sakusei Gijyutu" ("A Method For Producing A Thin Film By Newly Sol-Gel Reaction") authored by Hiroshi Hirashima and published by Sogo Gijutu Center, p. 29, or "Sol-Gelhou no Kagaku" ("Science of Sol-Gel Reaction") authored by Sumio Sakka authored by Agne Shofusha, p. 154, or the like). These examples include an acid catalyst and an alkali catalyst. The examples of the acid catalyst include an inorganic acids and organic acids such as hydrochloric acid, nitric acid, sulfuric acid, phosphoric acid, acetic acid, oxalic acid, tartaric acid, toluenesulfonic acid and the like.

The examples of the alkali catalyst include an alkali metal hydroxide such as ammonium hydroxide, potassium hydroxide, sodium hydroxide and the like; a quaternary ammonium hydroxide such as tetramethylammonium hydroxide, tetraethylammonium hydroxide, tetrabutylammonium hydroxide and the like; amines such as ammonia, triethylamine, tributylamine, morpholine, pyridine, pyperidine, ethylenediamine, diethylenetriamine, ethanolamine, diethanolamine, triethanolamine and the like; aminosilanes such as 3-aminopropyltriethoxysilane, N-(2-aminoethyl)-3-aminopropyltrimethoxysilane and the like; and the like.

The other examples include a metal alokoxide such as organotin compound, titanium tetraisopropoxide, diisopropoxytitanium bisacetylacetonate, zirconium tetrabutoxide, zirconium tetrakis(acetylacetonate), aluminum triisopropoxide, aluminum trisethylacetonate, trimethoxyborane and the like; and the like.

The addition amount of the catalyst is preferably 2 mole equivalent or less and more preferably 1 mole equivalent or less, based on 1 mole of the metallic compound. However, if the metallic compound has a functional group (for example, an amino group, a carboxyl group or the like) which shows the catalytic action, it is preferred to adjust the addition amount of the catalyst.

In the sol-gel reaction, as mentioned above, there exist two reactions, that is, hydrolysis reaction and polycondensation reaction, and the individual reactions proceed simultaneously. Therefore, although both reactions may not be distinguished corresponding to the reaction operation, the former hydrolysis reaction mainly occurs at the early stage of the reaction and the latter reaction mainly occurs at the later stage of the reaction. In addition, it is known that the progressing process of both reactions varies depending on the type of the catalyst. In general, if an acid catalyst is used, the hydrolysis reaction proceeds readily, and if an alkali catalyst is used, the polycondensation reaction proceeds readily.

The sol-gel reaction may be promoted by heating, microwave irradiation, infrared irradiation and the like. Therefore, in Step (A), the progress degree of the sol-gel reaction may be controlled with the amount of water or a catalyst, with or without the heating means, the reaction time and the like. As the sol-gel reaction is progressed, the particle of a metallic oxide becomes larger. Accordingly, the particle size of a metallic oxide in the finally resulting film is determined by the progress degree of the sol-gel reaction.

In the present invention, as mentioned later, the particle size of a metallic oxide may be controlled mainly in the film forming step. However, the extent of reaction preferably is controlled even in Step (A), which is a pre-step of the film forming step. From such reasons, the sol-gel reaction in the step is carried out at approximately from 0 to 150° C., more preferably at from 1 to 100° C. and further more preferably at from 20 to 60° C., and preferably for from 1 to 50 hours and more preferably for approximately from 1 to 30 hours. The term "to" in the present invention is used including the numeric values of both ends. The progress of the reaction may be confirmed by the increase in viscosity and the change in appearance such as white turbidity and the like of a mixture.

(2) Step B of the First Method

In Step (B) of the present invention, a solution (referred to as a "resin solution") containing a transparent resin as a solute is prepared. The transparent resin is an organic polymer having a parallel light transmittance of 70% or more when the film thickness is 30 μm. The transparent resin used in the present invention preferably has a solubility in water or a solvent miscible with water. The examples of such a transparent resin include polyimide, polycarbonate, polyacrylate, polymethacrylate (PMMA), polyetherketone, polyetheretherketone, polystyrene, polyester, epoxy resin, polyamide, polysulfone, polyaramid, polyurethane, polyvinyl acetate, polyvinylalcohol (PVA) and polyacrylic acid.

Among these, preferred are polyimide, polycarbonate, polyacrylate, PMMA, polyetherketone, polyetheretherketone, polystyrene, polyester and the like, which are soluble in a solvent having a high boiling point and polarity. Since a solvent having a high polarity has high affinity with water, as mentioned later, the sol-gel reaction is readily carried out in a resin solution. In addition, if a solvent having a high boiling point is used, the particle size of metallic oxide particles dispersed in a transparent resin and the like are readily controlled in the film forming step of (D) as mentioned later. The transparent resins may be used alone or in combination with each other.

In addition, in case of a transparent resin which can dissolve in water, like polyvinylalcohol and polyacrylic acid, or in case of using a resin having low heat resistance, they preferably are used after crosslinking in order to improve the water resistance or heat resistance of the resulting film. When polyvinylalcohol is used in combination with a resin having a functional group of a polyacrylic acid, a polyamic acid and the like, it is especially preferable because a crosslinking reaction occurs and the water resistance is improved. The crosslinking reaction between polyvinylalcohol and a polyacrylic acid is typically carried out by thermal treatment, but the esterified catalyst described in PCT/JP2006/310193 may be used in order to lower the treatment temperature and shorten the treatment time.

The solvent used in Step (B) is not limited as long as it is a solvent which may dissolve a transparent resin. The solvent refers to a liquid substance which dissolves a solute and may be either an organic solvent or water. The examples of such a solvent include those mentioned in the above step (A). The solvent especially used in Step (B) preferably is a solvent which is the same as or compatible with the solvent used in the above step (A).

The step for providing a solution containing a transparent resin of the present invention as a solute may be carried out by dissolving the transparent resin in the solvent. In dissolving the transparent resin, heating or ultrasonic irradiation may be applied where necessary. The solution may be prepared by purchasing a commercially available solution containing a transparent resin as a solute. The concentration of the solution is preferably 1 to 50% by mass and more preferably 5 to 30% by mass.

(3) Step C of First Method

In Step (C) of the present invention, the mixture obtained in the above Step (A) is mixed with the solution obtained in the above Step (B). The mixing method is not particularly limited but may be carried out by pouring the mixture obtained in Step (A) into the solution obtained in Step (B), followed by stirring with a stirrer and the like. The mixing ratio at this time is not particularly limited, however, it is preferably adjusted so that the metallic oxide in the finally resulting optical film is a desired amount.

After Step (C) and before Step (D), the sol-gel reaction (hereinafter, referred to as an "additional reaction") of the metallic compound present in the mixture obtained in Step (C) may be allowed to proceed where necessary. In the additional reaction, heating, microwave irradiation, infrared irradiation and the like may be carried out. The conditions of the additional reaction preferably are the same as the reaction conditions of Step (A) and the additional reaction is more preferably conducted at 20 to 60° C. for approximately 1 to 30 hours.

In the above additional reaction, the sol-gel reaction between the metallic compound and a metallic compound originally present in the mixture obtained in Step (C) may be allowed to proceed by newly mixing one or more kinds of substances selected from a solvent, water and a catalyst. At this time, if there is newly added a metallic compound different from the metallic compound originally present in the mixture obtained in Step (C), it is preferable because the refractive index of a metallic oxide contained in the finally resulting optical film may be adjusted to a desired value. In addition, in the additional reaction, if an alkali catalyst is newly added, the polycondensation reaction of a metallic compound may be promoted.

(4) Concerning Step (E) of Second Method

The Step (E) preferably is carried out in the same manner as the already mentioned Step (B). However, it is preferable that the solvent used in Step (E) may dissolve a metallic compound used in Step (F).

(5) Concerning Step (F) of Second Method

In the step, the sol-gel reaction is carried out by mixing a metallic compound which forms a metallic oxide by a sol-gel reaction with a solution (resin solution) containing the transparent resin obtained in Step (E) as a solute. As with Step (A), when a metallic compound has a functional group such as an alkoxide group and the like, it is preferable that the metallic compound is hydrolyzed to produce a hydroxyl group, followed by performing polycondensation reaction. For this purpose, water may be added where necessary. Further, water may contain a catalyst.

The above reaction may be carried out, for example, by dissolving the metallic compound in the resin solution obtained in Step (E) and adding water which may contain a catalyst where necessary, at room temperature or by heating to a predetermined temperature. In this case, two or more kinds of the metallic compounds may be used.

The mixing ratio of a resin solution to the metallic compound in the step is adjusted so that the content of a metallic compound in the finally resulting optical film is a desired amount, as mentioned above. Since a metallic compound to be mixed in the step is not yet subjected to the sol-gel reaction, it is easily dissolved in a solvent and may be directly mixed with a resin solution. However, if a metallic compound is difficult to dissolve in a resin solution, it may be once dissolved in a solvent to mix with the resin solution. The solvent used at that time preferably is compatible with a resin solution.

The preferred conditions of the sol-gel reaction (the concentration, temperature, time and the like of the reaction system) in the step may not be specified because they vary depending on the type and molecular weight of a transparent resin used. However, if the reaction is carried out at a high temperature or for a long period of time when the concentration of a resin solution is high, the molecular weight of a metallic oxide is increased, thereby possibly causing a high viscosity and gellation. This reason is that the sol-gel reaction is readily allowed to proceed nonuniformly because the viscosity of a resin solution is increased, thus resulting in insufficient stirring. Since the viscosity of a resin solution is increased when the molecular weight of a transparent resin in a resin solution is large, a similar phenomenon is likely to occur. Therefore, the reaction is preferably carried out so that the solid content concentration in the solution is 1 to 50% by mass and further 5 to 30% by mass. The solid content refers to a resin and a metallic compound/metallic oxide. In addition, the reaction temperature is preferably from 0 to 150° C., more preferably from 1 to 100° C. and further more preferably from 20 to 60° C. The reaction time is preferably approximately from 1 to 50 hours and more preferably approximately from 1 to 30 hours.

In addition, as with Step (C), after Step (F) and before Step (G), water which may contain a metallic compound to form a metallic oxide through a sol-gel reaction, a solvent and a catalyst may be blended to the flask newly, then the sol-gel reaction between said metallic compound and a metallic compound originally present in the mixture obtained in Step (G) may be allowed to proceed.

The solvent newly added at this time preferably is water, N,N-dimethylacetamide, N,N-dimethylformamide, N-methyl-2-pyrroridone, DMSO, cyclopentanone, cyclohexanone, methyl ethyl ketone, acetone, THF, dioxane, methanol, ethanol, propanol, butanol, cyclohexanol, methycellosolve or ethylcellosolve. The solvent may be the same as or different from the solvent used in Step (E).

(6) Concerning Control of Particle size of Metallic Oxide

The control of the particle size of a metallic oxide may be conducted by adjusting "the drying conditions in the film forming step" and "the interaction between a transparent resin and a metallic oxide". The adjustment in the film forming step is described in the next section, and here, there is explained the control of the particle size by "the interaction between a transparent resin and a metallic oxide". If the interaction between a transparent resin and the metallic oxide is strengthened, the particle of the metallic oxide is reduced because the metallic oxide becomes difficult to separate from the resin. Adversely, if these interactions are reduced, the metallic oxide particle is enlarged.

In order to decrease the particle size of a metallic oxide in a film by strengthening the interaction, there are preferably used a metal alkoxide, a metal acetylacetonate, a metal carboxylate, a nitrate, an oxychloride, or a chloride having a functional group which readily causes the interaction with a transparent resin as the metallic compound. As the examples of the functional group which readily causes the interaction with a transparent resin, there may be mentioned amino group, epoxy group, vinyl group, acryl group, methacryl group, isocyanate group, mercapto group and the like.

As the examples of the metallic compound having a functional group which readily causes the interaction with a transparent resin, there may be mentioned vinyltrichlorosilane, vinyltrimethoxysilane, vinyltriethoxysilane, (3,4-epoxycyclohexyl)ethyltrimethoxysilane, glycidoxypropyltrimethoxysilane, glyciloxypropyl triethoxysilane, styryltrimethoxysilane, methacryloxypropylmethyldimethoxysilane, methacryloxypropyltrimethoxysilane, methacryloxypropylmethyldiethoxysilane, methacryloxypropyltriethoxysilane, acryloxypropyltrimethoxysilane, 3-aminopropyltrimethoxysilane, 3-aminopropyltriethoxysilane, 3-aminopropylmethyldimethoxysilane, 3-aminopropylmethyldiethoxysilane, N-2-(aminoethyl)-3-aminopropylmethyldimethoxysilane, N-2-(aminoethyl)-3-aminopropyltrimethoxysilane, 2-aminoethylaminomethyltrimethoxysilane, 3-aminopropyldimethylethoxysilane, 2-(2-aminoethylthioethyl)triethoxysilane, p-aminophenyltrimethoxysilane, N-phenyl-3-aminopropylmethyldimethoxysilane, N-phenyl-3-aminopropylmethyldiethoxysilane, N-phenyl-3-aminopropyltrimethoxysialne, N-phenyl-3-aminopropyltriethoxysilane, mercaptopropyltrimethoxysilane, mercaptopropylmethyldimethoxysilane, isocyanatepropyltriethoxysilane and the like.

In addition, in order to enhance the interaction between a metallic oxide and a transparent resin, there may be introduced a functional group which may form a covalent bond, a hydrogen bond, an ionic bond and the like into a transparent resin. The examples of the functional group capable of covalent bonding include an alkoxysilyl group, a silanol group and the like. The examples of the functional group capable of hydrogen bonding include a hydroxyl group, a carboxyl group, an amino group and the like. In addition, the examples of the functional group capable of ionic bonding include an ammonium group and the like.

The specific example capable reducing the particle size of a metallic oxide includes a combination of a transparent resin such as PMMA, PVA, polyamic acid, polyimide or the like and a metallic compound having an amino group and an epoxy group.

On the contrary, in order to enlarge the particle size of a metallic oxide in a film by weakening the interaction between a transparent resin and a metallic compound, there is preferably selected a combination in which the interaction between a transparent resin and a metallic compound is not likely to occur. For example, it is preferable to combine a transparent resin having a polar group with an alkyl metal alkoxide having an alkyl group and an alkoxyl group as a metallic compound. The reason is that a metallic compound having an alkyl group is not compatible with a transparent resin having a polar group because the alkyl group is hydrophobic and the interaction between them is reduced. At this time, it is more preferable that water is used as a solvent of a resin solution and a transparent resin is made to be water-soluble. For example, there is explained a combination in which methyltrimethoxysilane is used as a metallic compound, polyvinylalcohol (PVA) and polyacrylic acid (PAA) are used as a transparent resin, and water is used as the solvent. A metallic oxide formed from methyltrimethoxysilane has a methyl group at the terminal. The methyl group is not compatible with water which is a solvent and the polar part of polyvinylalcohol (PVA) and polyacrylic acid (PAA). For this reason, the metallic oxide has a tendency to easily separate from a transparent resin and a solvent. However, on the other hand, the methyl group has an affinity with the non-polar part of polyvinylalcohol (PVA) and polyacrylic acid (PAA). Accordingly, the metallic oxide is not completely separated from polyvinylalcohol (PVA) and polyacrylic acid (PAA), and a state in which the metallic oxide is adequately separated from polyvinylalcohol (PVA) and polyacrylic acid (PAA) is maintained. The particle size of the metallic oxide in polyvinylalcohol (PVA) and polyacrylic acid (PAA) may be finally adjusted to a certain degree of size. However, the mechanism of controlling the particle size is not limited. In this case, the alkyl metal alkoxide is preferably used together with other metallic compounds (tetramethoxysilane and the like).

Incidentally, the particle size of a metallic oxide in an optical film of the present invention may be nonuniform with respect to the film thickness direction. The reason is that when an optical film of the present invention is used as an optical diffusion film, the wavelength dependency of the diffused light may be reduced. The distribution of the particle size of a metallic oxide may be controlled by the film forming step, as mentioned below.

1-2 Film Forming Step (Steps D and G)

In Steps (D) and (G) of the present invention, the mixture (including the mixture subjected to the additional reaction) obtained in the above step is applied or spread over to a substrate or container, followed by heating to evaporate the solvent to form a film. In the step, the sol-gel reaction may be further allowed to proceed because heating is performed in evaporating the solvent.

Spreading means that the mixture is poured into a container such as glass, metal, plastics and the like and the container is rotated to adhere the mixture to the wall of the container and the like, followed by forming the mixture into a film. The mixture containing the solvent formed in a film form is called a film precursor.

Applying means that the mixture is applied on a substrate and the like in an approximately fixed thickness to obtain a film precursor. The substrate is a flat member, and the examples of the substrate include a substrate of glass, quartz, metal, ceramics, plastics, rubber and the like, a roll, a glass plate such as a belt, a polymer film, and the like. The applying may be performed by a well-known method. The examples of applying method includes a flow coating method, an immersion coating method, a spray coating method and the like. At that case, there may be used a well-known applicator such as a bar coater, a knife coater, a blade coater, a die coater, a comma coater, a roll coater, a gravure coater, a curtain coater, a spray coater, a spin coater and the like.

Further, the mixture may be applied on one side or both sides of a transparent film to obtain a coating film. In addition to this, the mixture and a different application solution may be applied on a substrate to obtain a multilayer film. When a film is formed as a multilayer film, the order of applying a mixture solution for a film and a different application solution may be arbitrary.

In the step, the method of evaporating (drying) the solvent of the film precursor which is applied is performed by using a usual heating and drying oven. At this time, the film precursor may be subjected to treatment such as pressure reduction, air supply, infrared irradiation, ultra-high frequency irradiation and the like. The drying may be conducted in an atmosphere such as air, inert gas (nitrogen, argon) and the like.

(1) Concerning Particle Size Control of Metallic Oxide

As mentioned above, in an optical film of the present invention, the metallic oxide particles dispersed in a film preferably has a "particle size gradient".

A film having such a particle size gradient is obtained by optimizing the drying conditions of the step. The reason is that when a film precursor is dried, there competitively occur the particle growth of the metallic oxide due to the progress of the sol-gel reaction and the reduction in flowability accompanied by the evaporation of the solvent in the film precursor. Since the optimum condition at this time varies depending on the type of a transparent resin, the concentration of a metallic oxide and the kind of a solvent, it is difficult to be generalized. However, a preferred particle size gradient may be obtained 1) by selecting the conditions so that the evaporation rate of a solvent in a film precursor is decreased, and 2) by accordingly selecting the conditions so that metallic oxide particles in a film precursor are grown to a certain size.

Firstly, 1) there are explained the conditions in which the evaporation rate of a solvent in a film precursor is decreased. If the film precursor is dried in this manner, it may be considered from the following reasons that the particle size gradient of a metallic oxide particle occurs.

If the film precursor is dried so that the evaporation rate of the solvent is decreased, although the evaporation rate of the solvent in the whole film is low, the solvent in the vicinity of the interface (surface contacting with air on the film) of the film precursor is evaporated rapidly. For this reason, since the flowability in the vicinity of the air interface of the film precursor is decreased, the reaction between the metallic compounds is not likely to occur, thereby terminating the growth of the metallic oxide particles in the interface vicinity. On the other hand, since the evaporation of the solvent inside the film is slow compared to that on the air interface, the metallic oxide particles grow because the flowability is not lost. For this reason, the particle size of the metallic oxide present on the substrate interface side of the film becomes large and the particle size of the metallic oxide present on the air interface side becomes small. In addition, if the solvent permeability of the substrate applied to the film precursor is increased, the particle size of the metallic oxide particles inside the film may be increased and the particle size of the metallic oxide particles in the vicinity of both sides of the film may be reduced.

The conditions in which the evaporation rate of a solvent in a film precursor is decreased vary depending on the type of a transparent resin, the concentration of a metallic oxide, the kind of a solvent. However, the film precursor is preferably dried so that the mass of a solvent (hereinafter referred to as the "mass of the residual solvent after 150° C. for one hour") remained in the film precursor after drying the film precursor at 150° C. for one hour is 50 parts by mass or less based on 100 parts by mass of the original solvent. Alternatively, the film precursor is preferably dried so that the mass of the residual solvent after 100° C. for 5 hours or the mass of the residual solvent after 50° C. for 10 hours is 50 parts by mass or less based on 100 parts by mass of the original solvent.

The evaporation rate of a solvent at a fixed temperature may be adjusted by adjusting the boiling point by plural combinations of solvents and by evacuating the atmosphere to a reduced pressure. In addition, the atmosphere may be under a gas flow by using an air supply oven.

Next, 2) there are explained the conditions in which the metallic oxide particles in the film precursor are grown to a certain size. The drying temperature in the film forming step is lower, the particle size becomes smaller as a whole without the growth of the metallic oxide particles. The reason is that the progress of the sol-gel reaction of a metallic compound is delayed. Since the progress of the sol-gel reaction is slow and the sol-gel reaction is not progressed until the metallic oxide particles grow to a large particle size, no metallic oxides with a large particle size exist. Therefore, if the drying temperature is low, the particle size gradient is also small.

On the contrary, if the drying temperature is high, the particle size becomes large as a whole. The reason is that the progress of the sol-gel reaction becomes fast. And, since the evaporation of the solvent in the vicinity of the air interface of the film precursor becomes fast, the particle is difficult to grow on the air interface side, however, since the growth of the particle becomes fast on the substrate interface side, the particle size gradient becomes large.

If the drying temperature is elevated, a rising rate to the temperature (temperature rising rate) also exerts an influence on the particle size and the particle size distribution. As the temperature rising rate is increased, the particle size tends to be large, and as the temperature rising rate is reduced, the particle size trends to be small. Since the evaporation rate of a solvent, the reaction rate of the sol-gel reaction and the flowability of a film are directly related to the phenomenon, it is difficult to generalize a suitable combination of the temperature, temperature rising rate and drying time. However, if the drying temperature is elevated, or if the temperature rising rate is too large, a film causes foams. In addition, if the drying temperature is lowered, or if the temperature rising rate is too small, the metallic oxide particles do not grow sufficiently. Therefore, in order to grow the metallic oxide particles in an optical film to a certain size, the drying conditions are preferably at 40 to 180° C. for 1 to 50 hours. Of these, the drying temperature is preferably at 60° C. or more and more preferably at 100° C. or more. In addition, the temperature rising rate is preferably from 0.1 to 25° C./min, more preferably from 0.1 to 15° C./min and further more preferably from 0.5 to 10° C./min.

Further, the particle size of a metallic oxide varies depending on the boiling point of a solvent. If the drying temperature is the same, since the higher the boiling point of a solvent, the evaporation rate of a solvent becomes smaller, the particle size gradient becomes large, as mentioned above. In addition, if the evaporation rate of a solvent is the same, since the higher the boiling point of a solvent, the drying temperature becomes higher, the particle size and the particle size gradient of a metallic oxide becomes large. As such a solvent, preferred are N,N-dimethylacetamide, N,N-dimethylformamide, N-methyl-2-pyrrolidone, cyclopentanone and the like.

The above conditions are preferably adjusted and determined according to the structure of an optical film to be obtained, and there is shown below an example in which the particle size may be increased as a whole and the particle size gradient in the film thickness direction may be increased.

In Case of Using PMMA, PVA and the Like as a Transparent Resin and NMP and DMAC as a Solvent:

A film precursor is heated to approximately 50 to 120° C. at a rate of 0.5 to 10° C./min and dried at 120° C. for a few hours where necessary.

In Case of Using Polyamic Acid as a Transparent Resin:

A film precursor is heated to approximately 50 to 180° C. at a rate of approximately 0.5 to 10° C./min. Further, the polyamic acid may be subjected to imidization reaction by thermally treating at 280 to 380° C.

If the particle size is decreased as a whole and the particle size distribution in the film thickness direction is reduced, a film precursor having the same composition as above is preferably vacuum dried at room temperature for approximately 5 hours, followed by heating to dry under the above conditions.

The Steps (D) and (G) are preferably performed by using a dryer which is programmed with a predetermined drying temperature and temperature rising rate. Alternatively, for example, after arranging multiple dryers such as ovens and the like, which are set at a predetermined temperature such as 60° C., 90° C., 120° C. and the like, a film precursor may be sequentially put in each dryer to dry each for 5 minutes. In this case, the temperature rising rate is 4° C./min because the temperature is raised by the temperature difference of 60° C. for 15 minutes.

An optical film of the present invention may be obtained by using a homogeneous mixture containing a transparent resin, a solvent and a metallic compound as a film precursor, followed by growing metallic oxide particles in the precursor. For this reason, even if the metallic oxide particles in the film are dispersed with a particle size gradient, the volume fraction of the metallic oxide in the film thickness direction is not substantially changed. That is, the number of particles becomes large in a range where a metallic oxide having a small particle size is dispersed in a film. On the other hand, the number of particles becomes small in a range where a metallic oxide having a large particle size is dispersed in a film. For this reason, an optical film of the present invention has no difference in thermal expansion coefficient in the film thickness direction and has an advantage that no warpage due to temperature change occurs.

(2) Concerning Surface Smoothness Control

According to a complex technique by simple mixing of metallic oxide particles with a transparent resin, if the metallic oxide has a particle size of 1 μm or more, the smoothness of a film is lost. The reason is because the metallic oxide particles are extruded to the surface of the film. However, since the production method of the present invention grows the metallic oxide particles in a film precursor in Steps (D)

and (G), no metallic oxide particles are extruded from the film surface. Accordingly, a smooth film may be obtained even if the metallic oxide present in the film has a particle size of 1 μm.

Similarly, according to a complex technique by simple mixing of metallic oxide particles with a transparent resin, if the addition amount of the metallic oxide particles is increased, the metallic oxide particles are likely to be extruded to the surface of the film, thus losing the smoothness of the film. However, in the production method of the present invention, if the addition amount of the metallic oxide is increased, no particles are extruded to the film surface from the above reason, thus obtaining a smooth film.

Especially in order to obtain a film excellent in surface smoothness, it is preferable that the progress of the sol-gel reaction performed before Steps (D) and (G) is suppressed and the metallic oxide particles are grown in Steps (D) and (G). In order to retard the progress of the sol-gel reaction, for example, only an acid catalyst is used as a catalyst, the addition amount of a catalyst is decreased, the reaction temperature is lowered, a metallic compound having a relatively low reactivity is used, or acetic acid, acetylacetone or ethyl acetoacetate or the like is used.

However, in the production method of the present invention, if a metallic oxide forms an agglomerate even if the metallic oxide has a particle size of less than 1 μm, the smoothness of the surface may be lost. In this case, as mentioned above, it is preferable to improve the dispersibility of a metallic oxide by enhancing the interaction between a transparent resin and the metallic oxide.

The surface smoothness of a film may be evaluated by measuring a mean surface roughness (Ra) by scanning an optical film surface in a range of 200 μm angle by AFM. The mean surface roughness (Ra) is calculated by expanding to three-dimension in order that a center-line mean roughness defined in JIS B0601 is applicable to the measured face, and is a "mean value of the absolute value of the deviation from the reference surface to the specified face". The surface smoothness of an optical film in the present invention is preferably 300 nm or less as Ra and more preferably 100 nm or less. As mentioned above, the reason is that the damageability of a prism sheet may be suppressed when an optical film of the present invention is used in combination with a prism sheet.

(3) Concerning Film Thickness

A well-known method may be used for the control of a film thickness in the film forming step. For example, a film with a desired film thickness may be obtained by accordingly adjusting a gap of a tool used for application such as a bar coater and the like.

(4) Other Components

In the production method of the present invention, there may be added an additive according to the purpose in each step. The examples of the additive include UV absorbent, cross linking agent, thickener, filler, sensitizer, plasticizer, photopolymerization initiator, monomer, oligomer, stabilizer, wetting agent, fluid agent, pigment, dye, adhesion promoter, reaction catalyst and dehydrating agent.

3. Application of Optical Film of the Present Invention (1) Specific Optical Attribute Film A specific optical attribute film of the present invention has a total light transmittance of 70% or more and a haze value of 20% or more. For this reason, the film is characterized in that it has a high total light transmittance and a high ratio of diffuse transmitted light rather than parallel transmitted light among transmitted light, that is, it has a high light diffusing property (excellent in light-diffusing property). Especially when the metallic oxide particles are dispersed in a film with a particle size gradient, the wavelength dependency of the diffused light may be reduced.

The specific optical attribute film may be either a type of diffusing transmitted light (front scattering) or a type of diffusing reflected light (rear scattering). In addition, the specific optical attribute film may be a type of causing diffusion to both transmitted light and reflected light or light propagating in a coating film or a film.

From these properties, the specific optical attribute film may be used as a light diffusing coating for optical application and an optical diffusion film. For example, the specific optical attribute film may be used as an optical transmission film, a sheet, a mirror, a half mirror such as plastics, glass and the like, or a coating or a film for a well-known display element for as anti-glare or reflection prevention.

In addition, the specific optical attribute film of the present invention is suitable for a display device such as FPD and the like. Specifically, the specific optical attribute film is suitable as a screen of a projection type display device using a display element such as LCD and the like or a light diffusion plate and a light diffuse reflection material for improving the in-plane distribution of the brightness and chromaticity in a liquid crystal display element.

In the filed of these FPDs, there are demanded a reduction in size and weight and a total cost saving, and the specific optical attribute film of the present invention may satisfy the requirements. For example, if the specific optical attribute film of the present invention is used instead of an optical diffusion film of a multilayer structure used in LCD, a film of a multilayer structure may be formed as a single layer, thereby contributing to a low profile of a display device. In such applications, the specific optical attribute film has preferably a haze value of 70% or more, an Ra of 100 nm or less and a film thickness of 30 μm or less.

Needless to say, the specific optical attribute film is suitably used for an application in which the value of 70% or less as a haze value is required.

(2) Gradient Structure Film

A gradient structure film of the present invention is characterized in that it is an optical film in which a metallic oxide is dispersed in a transparent resin, wherein the particle size of the metallic oxide gradiently varies and the volume fraction of the metallic oxide does not substantially vary in the film thickness direction of the optical film. For this reason, since the gradient structure film of the present invention is excellent in light diffusing capability and the wavelength dependency of the diffused light may be reduced, it is also suitably used for the applications described in the above-mentioned specific optical attribute film.

In addition, when the gradient structure film of the present invention is used for the light extraction of the LED, inorganic EL or organic EL, it may diffuse light as well as prevent the total reflection phenomenon occurring at the interface with a transparent resin having a different refractive index.

Further, since the gradient structure film has a structure in which a metallic oxide present on the substrate interface side has a particle size of a submicron to a micron order and a metallic oxide present on the air interface side is dispersed at a nano-order level, it is characterized in that the substrate interface side has a light scattering effect but the air interface side has almost no light scattering effect. Therefore, the gradient structure film is useful as an optical film having nonconventional functions. Such an optical film has the average refractive index of a transparent resin and a metallic oxide.

EXAMPLES

Hereinafter, the present invention will be explained in more detail with reference to Examples, but the present invention is not limited by these Examples. Abbreviations in Examples mean as follows:
DMAC: Dimethylacetamide
NMP: N-methyl-2-pyrrolidone
TMOS: Tetramethoxysilane
APTMOS: Aminopropyltrimethoxysilane
GPTMOS: Glycidoxypropyltrimethoxysilane
MTMOS: Trimethoxymethylsilane
PMMA: Polymethylmethacrylate
PVA: Polyvinylalcohol
PAA: Polyamic acid
HCl: Hydrochloric acid
$HNO_3$: Nitric acid
DCDA: Dicyanodiamide
NUC Silicone L-7001: Silicone leveling agent
TIPT: Titanium tetraisopropoxide
m-BP: 4,4'-(3-aminophenoxy)biphenyl
ODA: 4,4'-oxydianiline(4,4'-diaminodiphenylether)
PPD: p-phenylenediamine
BPDA: 3,3',4,4'-biphenyltetracarboxylic acid dianhydride
PMDA: Anhydrous pyromellitic acid Various measurements in Examples were made as follows:
(Optical Measurements)
The parallel transmittance, total light transmittance and reflectance of an optical film were measured by using an ultraviolet-visible spectrophotometer (UV 3100PC, manufactured by Hitachi Ltd.). The measurement conditions are as follows:
Measurement wavelength: 300 to 1000 nm, Wavelength resolution: 1 nm, Measurement mode: medium speed
In addition, by using the parallel transmittance and total light transmittance at a wavelength of 550 nm, a haze value was calculated from the following equation:

Haze value (%)={1−(Parallel transmittance/Total Light transmittance)}×100

(Surface Roughness Measurement)
The center-line mean surface roughness Ra of an optical film was measured by using a desktop compact probe microscope (Nanopics 1000, manufactured by Seiko Instruments Inc.). Specifically, the scan range was set at 200 μm angle and the center-line mean surface roughness Ra was measured five times to determine the mean value.

(Scratch Test)
A 3 cm angle prism sheet (produced by Goyo Paper Working Co., Ltd.), PC, pitch: 50 μm, height: 21 μm, apex angle: 100°, sheet thickness: 240 μm) was gently placed on a balance scale so that the prism surface is directed upward. An optical film of the same size was placed on the prism so that the air interface side in forming a film is directed downward. Further, a 1 cm angle plate was placed on the film and the plate was moved reciprocally by 2 cm on the optical film while applying loads of 10 g, 20 g and 50 g. Subsequently, the sheet was taken out and the degree of scratches was visually evaluated. The prism film with no scratches was evaluated as Good, the prism film in which scratches are not visually confirmed but are confirmed by an optical microscope is evaluated as Fair and the prism film in which scratches are visually confirmed is evaluated as Poor.

(Measurement of Content of Metallic Oxide: Thermogravimetric Determination)
An optical film was heated to 30 to 800° C. using a thermogravimetric apparatus (TGA-50, manufactured by Shimadzu Corporation). Subsequently, the metallic oxide content was calculated from the amount of ash remained after sintering at 800° C.

(TEM Observation)
An optical film was embedded with an epoxy resin and then trimmed with a glass knife, followed by cutting with a diamond knife to prepare an ultra-thin piece. The prepared ultra-thin piece was carbon reinforced and the resulting piece was observed at an acceleration voltage of 75 kV using a transmission electron microscope (TEM) (H-7000, manufactured by Hitachi Ltd.).

(Measurement of Particle Size and Volume Fraction by Image Analysis)
The area of a metallic oxide particle was determined by using an image analysis software (Image-Pro Plus, manufactured by Planetron Co., Ltd.) from an image obtained by TEM observation. Thereafter, the particle size was calculated by determining the diameter (corresponding to the circle) when the particle is considered as a circle from the area of the particle. At this time, the mean particle size per unit area (25 $\mu m^2$) was calculated by each range of 5 μm in the film thickness direction, and the mean particle size X of the metallic oxide particles present from the substrate interface of a film to 40% of the film thickness (X area) was calculated. In the same manner, the mean particle size Y of the metallic oxide particles present from another surface (air interface) to the same range (Y area) was measured. By using X and Y thus obtained, X/Y is used as a particle size gradient. In addition, the area fraction W of the particle per unit area (25 $\mu m^2$) in the X area and the area fraction V of the particle per the same unit area in the Y area were calculated. By using these values, W/V is used as a volume fraction.

(Linear Expansion Coefficient Measurement)
Elongation (shrinkage) was measured when a fixed load was applied on both ends in the length direction of a film and the temperature was changed, using a thermomechanical analyzer (TMA-50, manufactured by Shimadzu Corporation). The mean linear expansion coefficient (CTE) in the temperature range of 380 to 430° C. was determined by the measurement values.

(Viscoelasticity Measurement: Measurement of Storage Elastic Modulus at 450° C.)
By using RSA-II manufactured by Rheometrics Inc., the temperature variance in the tensile mode of a film was measured to determine the storage elastic modulus E' at 450° C. The measurement conditions were the temperature range of 30 to 50° C., the temperature rising rate of 3° C./min, the strain of 0.02% and the frequency of 1 Hz under the control of Auto-Strain. Further, the dimensions of a sample were the length of 20 mm and the width of 5 mm.

Example 1

Step (E): PMMA (1.0 g) which is a transparent resin and NMP (4.0 g) which is a solvent were mixed to prepare 5 g of a PMMA/NMP solution of 20% by weight of PMMA.

Step (F): A 20 ml reaction vessel was charged by the 5 g of the PMMA/NMP solution of 20% by weight of PMMA obtained in Step (E). Subsequently, TMOS (1.0857 g) which is a metallic compound that forms a metallic oxide by a sol-gel reaction and a 0.1 N HCl aqueous solution (0.5136 g) were added into the flask so that the content rate of a metallic oxide in the resulting film is 30% by weight, followed by performing reaction at room temperature for 5 hours. The 0.1 N HCl aqueous solution was diluted to 50% by weight with NMP and then added.

Step (G): The resulting solution was applied on a glass substrate using a baker applicator so that the dried film thickness is approximately 35 μm. Subsequently, the glass substrate was heated from 50 to 120° C. at a temperature rising rate of 3° C./min under a nitrogen atmosphere and dried at 120° C. for 2 hours by using an inert oven. In this manner, a PMMA/silica (silicon oxide) composite film was prepared on the glass substrate.

Thereafter, the film was peeled off from the glass substrate to obtain a PMMA-silica composite film having a film thickness of 35 μm. The resulting film had a total light transmittance of 91.0%, a total light reflectance of 7.3% and a haze of 35%.

Example 2

A PMMA-silica composite film having a film thickness of 35 μm was prepared in the same manner as Example 1 except that TMOS (0.6333 g) and a 0.1 N HCl aqueous solution (0.2996 g) were used so that the content rate of a metallic oxide in the optical film is 20% by weight. The resulting film had a total light transmittance of 92.0%, a total light reflectance of 75% and a haze of 24%.

Example 3

Step (E): PMMA (1.0 g) and DMAc (4.0 g) were mixed to prepare 5 g of a PMMA/DMAc solution of 20% by weight of PMMA.

Step (F)

A 20 ml reaction vessel was charged by the 5 g of the PMMA/DMAc solution of 20% by weight of PMMA obtained in Step (E). TMOS (1.0748 g) and a 0.1 N HNO$_3$ aqueous solution (0.5123 g) were added into the flask so that the content rate of a metallic oxide in the resulting film is 30% by weight, followed by performing reaction at room temperature for 2 hours. The 0.1 N HNO$_3$ aqueous solution was diluted to 50% by weight with DMAc and then added.

Subsequently, APTMOS (0.0128 g) was added to the solution, followed by performing reaction at room temperature for 2 hours. At this time, APTMOS was diluted to 10% by weight with DMAc and then added.

Step (G): The solution obtained in the above Step was applied on a glass substrate using a baker applicator so that the dried film thickness is approximately 15 μm. Subsequently, the glass substrate was heated from 50 to 120° C. at a temperature rising rate of 3° C./min under a nitrogen atmosphere and dried at 120° C. for 2 hours by using an inert oven. In this manner, a PMMA-silica composite film was prepared on a glass substrate.

Thereafter, the PMMA-silica composite film was peeled off from the glass substrate to obtain a PMMA-silica composite film having a film thickness of 15 μm. The resulting film had a total light transmittance of 85.0%, a total light reflectance of 15.0% and a haze of 95.1%.

Examples 4 to 7

A PMMA-silica composite film was prepared in the same manner as Example 3 under the conditions shown in Table 1. Specifically, a film was prepared by using a transparent resin, a solvent, a metallic compound which forms a metallic oxide by a sol-gel reaction and the like at the compositions shown in Table 1 and adjusting so that the content rates of the metallic oxide in the resulting film are 10, 15, 20 and 25% by weight. The film thickness and optical properties of the resulting film are shown in Table 1.

Example 8

Step (A): A 10 ml reaction vessel were charged by TMOS (0.3800 g) and DMAc (0.3749 g), and a 1.0 N HCl aqueous solution (0.1798 g) was added to react at room temperature for 3 hours. Separately, TIPT (0.3559 g) was added into a 10 ml reaction vessel, followed by adding acetic acid (0.3153 g) to react at room temperature for one hour. Subsequently, both solutions were mixed and allowed to react at room temperature for one hour.

Step (B): PMMA (1.0 g) and DMAc (3.0 g) were mixed to prepare 4 g of a PMMA/DMAc solution of 25% by weight of PMMA.

Step (C): The solution obtained in Step (A) and the solution obtained in Step (B) were mixed and allowed to react at room temperature for one hour. Subsequently, NUC Silicone L-7001 (0.0250 g) was added to the reaction mixture, followed by mixing at room temperature for 10 minutes. NUC Silicone L-7001 was diluted to 10% by weight with DMAc and then added.

Step (D): The solution obtained in the above step was applied on a glass substrate using a baker applicator so that the dried film thickness is approximately 20 μm. Subsequently, the glass substrate was heated from 50 to 120° C. at a temperature rising rate of 3° C./min under a nitrogen atmosphere and dried at 120° C. for 2 hours by using an inert oven. In this manner, there was prepared 20% by weight of the content rate of metallic acid, a silica/60% by weight of titania/40% by weight of PMMA-silica-titania composite film on a glass substrate.

Thereafter, the PMMA-silica-titania composite film was peeled off from the glass substrate to obtain a PMMA-silica-titania composite film having a film thickness of 20 μm. The resulting film had a total light transmittance of 91.0%, a total light reflectance of 9.5% and a haze of 92.4%.

Examples 9 and 10

A PMMA-silica composite film was prepared in the same manner as Example 8 under the conditions shown in Table 1. Specifically, a film was prepared by using a transparent resin, a solvent, a metallic compound which forms a metallic oxide by a sol-gel reaction and the like at the compositions shown in Table 1 and adjusting so that the content rates of the metallic oxide in the resulting film are 15 and 10% by weight. The film thickness and optical properties of the resulting film are shown in Table 1.

Example 11

Step (A): A 10 ml reaction vessel was charged by MTMOS (1.17 g), and a 0.06 N HNO$_3$ aqueous solution (0.46 g) was added to react at room temperature for one and a half hours.

Step (B): A 10 ml reaction vessel was charged by PVA (0.3 g) and PAA (0.71 g), and then purified water (1.9 g) and DCDA (0.172 g) were added, followed by stirring at room temperature for 15 minutes.

Step (C): The solution obtained in Step (A) and the solution obtained in Step (B) were mixed and allowed to react at room temperature for one hour.

Step (D): The resulting solution was filtered through a disk filter of 1 μm pore size and the filtrate was applied on a PET film having a film thickness of 11 μm using a baker applicator so that the dried film thickness is 24 μm. Subsequently, the PET film was dried at room temperature for 10 minutes and then dried at 40° C. for 10 minutes and at 120° C. for one hour using a blower oven. In this manner, there was prepared a PVA-PAA-silica composite film in which the content rate of a metallic oxide is 33% by weight on the PET film. The resulting film had a total light transmittance of 88.5%, a total light reflectance of 10.6% and a haze of 91.7%, as shown in Table 2. The film had an Ra of 88 nm.

Examples 12 to 15

A PVA-PAA-silica composite film was prepared in the same manner as Example 11 under the conditions shown in Table 2. Specifically, a film was prepared by using a transparent resin, a solvent, a metallic compound which forms a metallic oxide by a sol-gel reaction and the like at the compositions shown in Table 2 and adjusting so that the content rates of the metallic oxide in the resulting film are 10, 15, 20 and 25% by weight. The film thickness, optical properties, Ra and scratch test results of the resulting film are shown in Table 2.

Comparative Example 1

PMMA (1.0 g) and DMAc (4.0 g) were mixed to prepare 5 g of a PMMA/DMAc solution of 20% by weight of PMMA. The resulting 5 g of a PMMA/DMAc solution of 20% by weight of PMMA was charged into a 20 ml reaction vessel and $SiO_2$ particles (0.4285 g, mean particle size: 5.0 μm, Trade Name; HIPRESICA TS, produced by Ube-Nitto Kasei Co., Ltd.) were added so that the content rate of a metallic oxide in the resulting film is 30% by weight. The solution was stirred at room temperature for one hour and then subjected to ultrasonic treatment for one hour. The resulting solution was applied on a glass substrate using a baker applicator so that the dried film thickness is approximately 14 μm. Subsequently, the glass substrate was heated from 50 to 120° C. at a temperature rising rate of 3° C./min under a nitrogen atmosphere and dried at 120° C. for 2 hours by using an inert oven. In this manner, a PMMA/$SiO_2$ particle composite film was prepared on the glass substrate.

Thereafter, the PMMA/$SiO_2$ particle composite film was peeled off from the glass substrate to obtain a PMMA/$SiO_2$ particle composite film having a film thickness of 14 μm. The resulting film had a total light transmittance of 89.9%, a total light reflectance of 7.1% and a haze of 52.6%. The film had an Ra of 498 nm. The scratch test was conducted by applying a load of 10 g and showed that scratches which may be visually observed occurred on the prism sheet.

Comparative Example 2

PVA (0.3 g) and PAA (0.71 g) were charged into a 10 ml reaction vessel, and purified water (1.9 g) and DCDA (0.172 g) were added, followed by stirring at room temperature for 15 minutes. Further, $SiO_2$ particles (0.4975 g, mean particle size: 5.0 μm, Trade Name; HIPRESICA TS, produced by Ube-Nitto Kasei Co., Ltd.) was added so that the content rate of a metallic oxide in the resulting film is 33% by weight. The mixture was stirred at room temperature for one hour and then subjected to ultrasonic treatment for one hour. The resulting mixture was applied on a PET film with a film thickness of 110 μm using a baker applicator so that the dried film thickness is approximately 16 μm. Subsequently, the PET film was dried at room temperature for 10 minutes and then dried at 40° C. for 10 minutes and at 120° C. for one hour using a blower oven. In this manner, there was prepared a PVA-PAA-$SiO_2$ particle composite film in which the content rate of a metallic oxide is 33% by weight on the PET film.

The optical measurements of the resulting film showed that the film had a total light transmittance of 86.2%, a total light reflectance of 11.8% and a haze of 88.0%, and the measurement of the surface roughness Ra showed that the film had an Ra of 720 nm. The scratch test was conducted by applying a load of 10 g and showed that scratches which may be visually observed occurred on the prism sheet.

It is clear from Examples 1 to 15 and Comparative Examples 1 to 2 that the film obtained by the production methods of the present invention has a thinner film thickness and is more excellent in optical properties and surface smoothness, compared to the film obtained by only mixing silica particles with a transparent resin. Further, it is also clear that when used in combination with a prism sheet, the optical film hardly damages the sheet.

TABLE 1

| | Polymer | Content Rate of Metallic Oxide (% by Mass) | Metallic Compound (% by Mass) | | | Catalyst | | |
| | | | TMOS | MTMOS | TIPT | Solvent | Acid | Base |
| --- | --- | --- | --- | --- | --- | --- | --- | --- |
| Example 1 | PMMA | 30 | 100 | — | — | NMP | 0.1N—HCl | — |
| Example 2 | PMMA | 20 | 100 | — | — | NMP | 0.1N—HCl | — |
| Example 3 | PMMA | 30 | 100 | — | — | DMAc | 0.1N—$HNO_3$ | APTMOS |
| Example 4 | PMMA | 25 | 100 | — | — | DMAc | 0.1N—$HNO_3$ | APTMOS |
| Example 5 | PMMA | 20 | 100 | — | — | DMAc | 0.1N—$HNO_3$ | APTMOS |
| Example 6 | PMMA | 15 | 100 | — | — | DMAc | 0.1N—$HNO_3$ | APTMOS |
| Example 7 | PMMA | 10 | 100 | — | — | DMAc | 0.1N—$HNO_3$ | APTMOS |
| Example 8 | PMMA | 20 | 60 | — | 40 | DMAc | 0.1N—HCl | — |
| Example 9 | PMMA | 15 | 60 | — | 40 | DMAc | 0.1N—HCl | — |
| Example 10 | PMMA | 10 | 60 | — | 40 | DMAc | 0.1N—HCl | — |
| Example 11 | PVA/PAA | 33 | — | 100 | — | $H_2O$ | 0.06N—$HNO_3$ | — |
| Example 12 | PVA/PAA | 25 | — | 100 | — | $H_2O$ | 0.06N—$HNO_3$ | — |
| Example 13 | PVA/PAA | 20 | — | 100 | — | $H_2O$ | 0.06N—$HNO_3$ | — |
| Example 14 | PVA/PAA | 15 | — | 100 | — | $H_2O$ | 0.06N—$HNO_3$ | — |
| Example 15 | PVA/PAA | 10 | — | 100 | — | $H_2O$ | 0.06N—$HNO_3$ | — |
| Comparative Example 1 | PMMA | 30 | Silica Paticles | | | DMAc | — | — |
| Comparative Example 2 | PVA/PAA | 33 | Silica Partices | | | $H_2O$ | — | — |

TABLE 1-continued

|  | Film | Optical Properties (@550 nm) | | |
| --- | --- | --- | --- | --- |
|  | Thickness (μm) | Transmittance (%) | Reflectance (%) | Haze Value (%) |
| Example 1 | 35 | 91.0 | 7.3 | 35.0 |
| Example 2 | 35 | 92.0 | 7.5 | 24.0 |
| Example 3 | 15 | 85.0 | 15.0 | 95.1 |
| Example 4 | 17 | 77.8 | 19.7 | 93.0 |
| Example 5 | 16 | 79.2 | 18.5 | 78.1 |
| Example 6 | 16 | 80.5 | 18.2 | 69.0 |
| Example 7 | 14 | 81.9 | 16.8 | 59.5 |
| Example 8 | 20 | 91.0 | 9.5 | 92.4 |
| Example 9 | 16 | 90.5 | 8.9 | 82.2 |
| Example 10 | 16 | 91.0 | 8.7 | 57.7 |
| Example 11 | 24 | 88.5 | 10.6 | 91.7 |
| Example 12 | 13 | 88.4 | 10.4 | 89.7 |
| Example 13 | 15 | 88.1 | 10.2 | 85.4 |
| Example 14 | 19 | 87.4 | 10.2 | 77.4 |
| Example 15 | 19 | 87.5 | 10.2 | 66.2 |
| Comparative Example 1 | 14 | 89.9 | 7.1 | 52.6 |
| Comparative Example 2 | 16 | 86.2 | 11.8 | 88.0 |

TABLE 2

|  |  | Content Rate of Metallic Oxide | Metallic Compound (% by Mass) | | | Sol- | Catalyst | | Film Thickness | Ra | Scratch Test | | |
| --- | --- | --- | --- | --- | --- | --- | --- | --- | --- | --- | --- | --- | --- |
|  | Polymer | (% by Mass) | TMOS | MTMOS | TIPT | vent | Acid | Base | (μm) | (nm) | 10 g Load | 20 g Load | 50 g Load |
| Example 11 | PVA/PAA | 33 | — | 100 | — | $H_2O$ | 0.06N—$HNO_3$ | — | 24 | 88 | Good | Good | Fair |
| Example 12 | PVA/PAA | 25 | — | 100 | — | $H_2O$ | 0.06N—$HNO_3$ | — | 13 | 34 | Good | Good | Good |
| Example 13 | PVA/PAA | 20 | — | 100 | — | $H_2O$ | 0.06N—$HNO_3$ | — | 15 | 62 | Good | Good | Fair |
| Example 14 | PVA/PAA | 15 | — | 100 | — | $H_2O$ | 0.06N—$HNO_3$ | — | 19 | 35 | Good | Good | Good |
| Example 15 | PVA/PAA | 10 | — | 100 | — | $H_2O$ | 0.06N—$HNO_3$ | — | 19 | 38 | Good | Good | Good |
| Comparative Example 1 | PMMA | 30 | Silica Paticles | | | DMAc | — | — | 14 | 498 | Poor | Poor | Poor |
| Comparative Example 2 | PVA/PAA | 33 | Silica Paticles | | | $H_2O$ | — | — | 16 | 720 | Poor | Poor | Poor |

Synthesis Example 1

A vessel equipped with a stirrer and a nitrogen introduction tube was charged by 261.0 g of DMAc as a solvent, and further 20.44 g of ODA and 16.12 g of m-BP were added, followed by stirring at 20 to 30° C. to dissolve. Thereafter, 30.84 g of PMDA was added into the vessel and the raw materials adhered to the inside of the flask was washed out with 11.0 g of DMAc. Then, the reaction system was heated to 50 to 60° C. and stirred for approximately one hour. Subsequently, to the reaction mixture was added 0.44 g of PMDA, followed by maintaining the temperature at 60° C. and stirring for approximately 4 hours to obtain the varnish 1.

Next, into a separate vessel with a stirrer and a nitrogen introduction tube was charged 263.0 g of NMP as a solvent and further 19.62 g of PPD was added, followed by stirring at 20 to 30° C. to dissolve. Thereafter, into the vessel were added 37.0 g of BPDA and 11.06 g of PMDA, and the raw materials adhered to the inside of the flask was washed out with 10.0 g of NMP. Subsequently, the reaction system was heated to 50 to 60° C. and stirred for approximately 4 hours to obtain the varnish 2.

Thereafter, a separate vessel with a stirrer and a nitrogen introduction tube was charged by the varnishes 1 and 2 at a weight ratio of 77:23, followed by heating to 50 to 60° C. and stirring for approximately 4 hours to obtain a polyamic acid solution. The polyamic acid solution in which the content rate of a polyamic acid is 20% by weight had an E-type viscosity of 30000 mPa·s at 25° C. A polyimide film obtained by an established method from the polyamic acid had a linear expansion coefficient of 10 ppm/° C.

Example 16

A 100 ml reaction vessel was charged by 18 g of the polyamic acid-NMP-DMAc solution (15% by weight of polyamic acid) obtained in Synthesis Example 1, and TMOS (1.378 g) and water (0.652 g) were added and allowed to react at 60° C. for 6 hours. TMOS and water were diluted to 50% by weight with NMP and then added. The solution thus obtained was applied on a copper foil using a baker applicator so that the dried film thickness is approximately 16 μm. Then, the copper foil was heated from 50 to 180° C. at a temperature rising rate of 3° C./min under a nitrogen atmosphere and dried by using an inert oven. Subsequently, the copper foil was heat treated at a temperature from 280° C. to 380° C. using an IR reflow oven to prepare a polyimide-silica composite film on the copper foil.

The copper foil was treated for approximately a few minutes by spraying a ferric chloride solution (40 Baume) from a spray type nozzle, followed by removing the foil to obtain a polyimide-silica composite film. Then, the film was washed with water and vacuum dried at 60° C. to obtain a polyimide-silica composite film having a film thickness of 16 μm.

FIG. 1 shows the TEM image of the resulting film and Table 4 shows the particle size and volume fraction determined by the image analysis from the TEM image. It was observed from FIG. 1 that the silica on the copper foil side was grown in a particulate form and the silica on the air interface side was dispersed at a nano level. In addition, Table 3 shows the silica content obtained by the TGA measurement of the resulting film, and Table 4 shows the linear expansion coefficient (CTE) and the elastic modulus at 450° C.

Example 17

A 100 ml reaction vessel was charged by 18 g of the polyamic acid/NMP-DMAc solution (15% by weight of polyamic acid) obtained in Synthesis Example 1, and TMOS (1.378 g) and water (0.652 g) were added and allowed to react at 60° C. for one hour. Then, APTMOS (0.0016 g) which is an amino group-containing alkoxysilane was added into the solution, followed by performing reaction at 60° C. for 5 hours to obtain a solution of a silica-dispersed polyamic acid composition. TMOS, APTMOS and water were diluted to 50% by weight with NMP and then added. From the solution thus obtained, a polyimide-silica composite film having a film thickness of 16 μm was prepared in the same manner as Example 16. Table 4 shows the particle size and volume fraction of the silica determined from the TEM image of the resulting film. In addition, Table 3 shows the silica content by the TGA measurement of the resulting film and Table 4 shows the elastic modulus at 450° C.

Examples 18 and 19

A solution of a silica-dispersed polyamic acid composition was obtained in the same manner as Example 17 under the condition shown in Table 3. Subsequently, a polyimide-silica composite film having a film thickness of 16 μm was prepared from the solution in the same manner as Example 16. Table 4 shows the particle size and volume fraction of the silica in the resulting film. In addition, Table 3 shows the silica content by the TGA measurement of the resulting film.

Example 20

The solution obtained in the same manner as Example 16 was applied on a copper foil with a baker applicator so that the dried film thickness is 16 μm. Then, the copper foil was dried at room temperature for 5 hours using a vacuum dryer and further heated from 50 to 180° C. at a temperature rising rate of 3° C./min under a nitrogen atmosphere and dried by using an inert oven. Subsequently, the copper foil was heat treated at a temperature from 280° C. to 380° C. using an IR reflow oven to prepare a polyimide-silica composite film on the copper foil.

A ferric chloride solution (40 Baume) was sprayed on a copper foil from a spray type nozzle, followed by treating for approximately a few minutes until the copper foil is completely removed. The resulting film was washed with water, followed by vacuum drying at 60° C. to obtain a polyimide-silica composite film having a film thickness of 16 μm. Table 4 shows the particle size of the silica in the resulting film. In addition, Table 3 shows the silica content by the TGA measurement of the film.

Example 21

A 100 ml reaction vessel was charged by 18 g of the polyamic acid/NMP-DMAc solution (15% by weight of polyamic acid) produced in Synthesis Example 1, and TMOS (1.282 g) and water (0.650 g) were added and allowed to react at 60° C. for one hour. Then, GPTMOS (0.1873 g) which is an epoxy-group included alkoxysilane was added into the solution, followed by performing reaction at 60° C. for 5 hours to obtain a solution of a silica-dispersed polyamic acid composition. TMOS, GPTMOS and water were diluted to 50% by weight with NMP and then added. Using the solution thus obtained, a polyimide-silica composite film having a film thickness of 16 μm was prepared in the same manner as Example 16. Table 3 shows the particle size of the silica in the resulting film, and Table 4 shows the silica content by the TGA measurement.

Comparative Example 3

From the polyamid acid/NMP-DMAc solution (12.5% by weight of polyamic acid) produced in Synthesis Example 1, a polyimide film having a film thickness of 16 μm was prepared in the same manner as Example 16. Table 3 shows the silica content by the TGA measurement of the resulting film, and Table 4 shows CTE (linear expansion coefficient) and the elastic modulus of the resulting film at 450° C.

Comparative Example 4

A solution of a polyamic acid composition was prepared by adding 2.690 g of a colloidal silica/DMAc solution (20% by weight of silica) to 18 g of the polyamic acid acid/NMP-DMAc solution (15% by weight of a polyamic acid) in Synthesis Example 1, followed by stirring at 60° C. for 5 hours. From the resulting polyamic acid solution, a polyimide-silica composite film was prepared in the same manner as Example 16. Table 4 shows the particle size of the silica in the resulting film. Table 3 shows the silica content by the TGA measurement of the resulting film, and Table 4 shows the elastic modulus of the resulting film at 450° C.

From Examples 16 to 21 and Comparative Examples 3 and 4, it was confirmed that in the optical film of the present invention, the silica particles are dispersed in a transparent resin in the film thickness direction with a particle size gradient and the volume fraction in the film thickness direction is 2 or less. In addition, it is also clear from the elastic modulus and values of CTE that the optical film of the present invention is excellent in dimensional stability in a high temperature range and mechanical properties.

Example 22

Confirmation Test of Refractive index Modulation Effect)

The measurement was made of the reflectance in the vicinity of the air interface of the polyimide-silica composite of Example 16 where the silica particles are dispersed in a polyimide film at a nano level. Firstly, a 100 ml reaction vessel was charged by 18 g of the polyamic acid/NMP-DMAc solution (15% by weight of polyamic acid) produced in Synthesis Example 1, and TMOS (1.838 g) and water (0.652 g) were added and allowed to react at 60° C. for one hour. Then, APTMOS (0.1505 g) which is an amino group-containing alkoxysilane was added into the solution, followed by performing reaction at 60° C. for 5 hours to obtain a solution of a silica-dispersed polyamic acid composition. TMOS, APTMOS and water were diluted to 50% by weight with NMP and then added.

From the resulting solution, a polyimide-silica composite film having a film thickness of 16 μm was prepared in the same manner as Example 16. TEM observation of the resulting film confirmed that it is a film which is similar in the structure in the vicinity of the air interface as the film of Example 16. The film had a reflectance of 10.58% at a wavelength of 550 nm and the refractive index determined from the reflectance was 1.61.

In addition, from the polyamic acid-NMP solution (12.5% by weight of a polyamic acid) produced in Synthesis Example 1, a polyimide film was prepared in the same manner as Example 16. The prepared film had a reflectance of 11.17% and the refractive index determined from the reflectance was 1.63. That is, it has been found that the refractive index is decreased by the addition of silica having a refractive index of 1.46 to a polyimide and the refractive index is modulated on the side where the silica particles of Example 16 are dispersed at a nano level.

Example 23

A 20 ml reaction vessel was charged by 6 g of a fluorine-modified polyamic acid-DMAc solution (a polyimide for optical use "OPI", produced by Hitachi Chemical Co., Ltd., 25% by weight of polyamic acid), and TMOS (0.911 g) and water (0.432 g) were added and allowed to react at room temperature for 5 hour. Water was diluted to 50% by weight with DMAc and then added. The resulting polyamic acid solution was applied on a glass substrate using a baker applicator so that the dried film thickness is approximately 50 μm. Subsequently, the glass substrate was heated from 50 to 330° C. at a temperature rising rate of 3° C./min under a nitrogen atmosphere by using an inert oven, followed by drying and imidization reaction to prepare a polyimide-silica composite film. The film was able to be easily peeled off from the glass substrate. TEM observation of the resulting film confirmed that the film contains particles in which the particle size gradiently varies in the cross-section direction of the film. In addition, Table 5 shows the particle size of silica obtained from image analysis. The film had a haze of 96% at a wavelength of 550 nm.

The resulting film was mounted on the surface opposite side in which a positive electrode of a transparent substrate of an organic electroluminescence plane light emitter (produced by IMES Co., Ltd.) is formed with a polyolefin adhesive sheet (TPXR, produced by Mitsui Chemicals Inc.) to use as a light diffusion member. Subsequently, the surface emitter was connected to a power supply (PA 36, manufactured by Kenwood Corporation), and the front brightness of 3000 cd/m$^2$ and 45 degrees slant brightness were measured when applying 0.27A and 32V. A brightness photometer (BP6, manufactured by TOPCON Corporation) was used for the measurement.

For the brightness in the device, it was confirmed that the front brightness was improved by 1.2 times and the 45 degrees slant brightness was improved by 1.3 times, as compared to the case where the light diffusion member was not disposed.

TABLE 3

| | polyamide Solution (g) | TMOS (g) ( ) in mmol | APTMOS (g) ( ) in mmol | GPTMOS (g) ( ) in mmol | H$_2$0 (g) | Silica Content (g) [Calculated Value] | Silica Content Rate (% by Mass) [Calculated Value] | Silica Content Rate (% by Mass) [Actual Measurement Value] |
|---|---|---|---|---|---|---|---|---|
| Example 16 | 18 | 1.378 (9.05) | 0 | 0 | 0.652 | 0.554 | 20 | 19.1 |
| Example 17 | 18 | 1.377 (9.05) | 0.0016 (0.009) | 0 | 0.652 | 0.554 | 20 | 19.5 |
| Example 18 | 18 | 1.375 (9.03) | 0.0041 (0.023) | 0 | 0.652 | 0.554 | 20 | 19.3 |
| Example 19 | 18 | 1.372 (9.01) | 0.0081 (0.045) | 0 | 0.652 | 0.554 | 20 | 19.4 |
| Example 20 | 18 | 1.378 (9.05) | 0 | 0 | 0.652 | 0.554 | 20 | 19.1 |
| Example 21 | 18 | 1.282 (8.42) | 0 | 0.1873 (0.7926) | 0.650 | 0.554 | 20 | 19.4 |

TABLE 4

| | Particle Size (nm) | | | Volume Fraction (% by Volume) | | Volume Fraction Gradient | Elastic Modulus | CTE (ppm/° C.) |
| | Maximum Particle Size In the range of 0-5 μm from Copper foil Side | Minimum Particle Size In the range of 12-17 μm from Copper Foil Side | Particle Size Gradient (Max./Min.) | Maximum | Minimum | (Max./Min.) | @450° C. (GPa) | α2 (380~430° C.) |
|---|---|---|---|---|---|---|---|---|
| Example 16 | 215 | 61 | 3.5 | 17 | 13 | 1.31 | 0.30 | 178 |
| Example 17 | 100 | 44 | 2.3 | 17 | 16 | 1.06 | 0.56 | — |
| Example 18 | 49 | 39 | 1.3 | 18 | 16 | 1.13 | 0.64 | — |
| Example 19 | 52 | 33 | 1.6 | 19 | 15 | 1.27 | — | — |
| Example 20 | 42 | 18 | 2.3 | — | — | — | — | — |
| Example 21 | 53 | 34 | 1.6 | — | — | — | — | — |
| Comparative Example 3 | — | — | — | — | — | — | 0.23 | 255 |
| Comparative Example 4 | 12 | 12 | 1.0 | 17 | 16 | 1.06 | 0.18 | — |

TABLE 5

| | Particle Size (nm) | | |
|---|---|---|---|
| | Maximum Particle Size In the range of 5-10 μm from Copper Foil Side | Minimum of Particle Size In the range of 40-45 μm from copper Foil Side | Particle Size Gradient (Max./Min.) |
| Example 23 | 2.07 | 1.03 | 2.01 |

INDUSTRIAL APPLICABILITY

Since the optical film of the present invention is excellent in light diffusing property, is a thin film and is excellent in surface smoothness, it is suitable in the filed of optical diffusion films and the like.

The present application claims the priority based on Japanese Patent Application No. 2006-076767 filed on Mar. 20, 2006 and Japanese Patent Application No. 2006-334374 filed on Dec. 12, 2006. The entire contents described in the application specifications are incorporated herein by reference.

The invention claimed is:

1. A method for producing an optical film having a total light transmittance of 70% or more and a haze value of 20% or more and having one surface or both surfaces of the film with a mean roughness of a surface (Ra) of 100 nm or less, the method comprising the steps of:
    (A) subjecting a metallic compound to form a metallic oxide through a sol-gel reaction in a solvent,
    (B) providing a solution containing a transparent resin as a solute,
    (C) mixing the mixture obtained in Step (A) and the solution obtained in Step (B), and
    (D) applying or spreading the mixture obtained in Step (C) to a substrate or container, followed by heating to evaporate the solvent to form a film outer-surface of which has a mean roughness of a surface (Ra) of 100 nm or less.

2. The method for producing an optical film according to claim 1, wherein before Step (D), the method further comprises a step of allowing to proceed a sol-gel reaction for the metallic oxide present in the mixture obtained in Step (C).

3. The method for producing an optical film according to claim 1, wherein the film forming Step of (D) comprises a step of growing the particles of a metallic oxide formed through the sol-gel reaction.

4. The method for producing an optical film according to claim 3, wherein the step of growing the particles of the metallic oxide is a step in which a particle size of the particles gradiently varies to the thickness direction of the optical film.

5. The method for producing an optical film according to claim 1, wherein the transparent resin is polyimide, polycarbonate, polyacrylate, polymethacrylate, polyetherketone, polyetheretherketone, polystyrene, polyester, epoxy resin, polyamide, polysulfone, polyaramid, polyurethane, polyvinyl acetate, polyvinylalcohol or polyacrylic acid.

6. The method for producing an optical film according to claim 1, wherein the metallic compound to form a metallic oxide through the sol-gel reaction contains silicon, titanium, zirconium or aluminum element.

7. The method for producing an optical film according to claim 1, wherein the metallic compound to form a metallic oxide through the sol-gel reaction is a metal alkoxide, a metal acetylacetonate or a metal carboxylate, or a polycondensation product thereof.

8. The method for producing an optical film according to claim 1, wherein in the sol-gel reaction, an inorganic acid, an organic acid, an inorganic base or an organic base is used as a catalyst.

9. The method for producing an optical film according to claim 1, wherein Step (D) includes a step of heating at 40 to 180° C. for 1 to 50 hours to evaporate the solvent.

10. The method for producing an optical film according to claim 1, wherein the solvent used in Step (A) is water, N,N-dimethylacetamide, N,N-dimethylformamide, N-methyl-2-pyrroridone, DMSO, cyclopentanone, cyclohexanone, methyl ethyl ketone, acetone, THF, dioxane, methanol, ethanol, propanol, butanol, cyclohexanol, methycellosolve, or ethylcellosolve.

11. The method for producing an optical film according to claim 1, wherein the metallic compound to form a metallic oxide through the sol-gel reaction includes an alkyl metal alkoxide having an alkyl group and an alkoxyl group in the molecule, and the solvent of the solution containing the transparent resin as a solute contains water.

12. The method for producing an optical film according to claim 1, wherein the optical film is an optical diffusion film.

13. A method of producing an optical device comprising a prism sheet and an optical film directly laminated on the prism sheet, including:
    (A) subjecting a metallic compound to form a metallic oxide through a sol-gel reaction in a solvent,
    (B) providing a solution containing a transparent resin as a solute,
    (C) mixing the mixture obtained in Step (A) and the solution obtained in Step (B), and
    (D) applying or spreading the mixture obtained in Step (C) to a substrate or container, followed by heating to evaporate the solvent to form a film outer-surface of which has a mean roughness of a surface (Ra) of 100 nm or less,
    (E) directly laminating the film on a prism sheet so that the outer-surface of the film face to the prism sheet.

* * * * *